United States Patent
Kudo

(10) Patent No.: US 7,636,494 B2
(45) Date of Patent: Dec. 22, 2009

(54) METHOD AND APPARATUS FOR CORRECTING PIXEL IMAGE SIGNAL INTENSITY

(75) Inventor: Chiaki Kudo, Amagasaki (JP)

(73) Assignee: Panasonic Corporation, Osaka (JP)

( * ) Notice: Subject to any disclaimer, the term of this patent is extended or adjusted under 35 U.S.C. 154(b) by 772 days.

(21) Appl. No.: 11/003,735

(22) Filed: Dec. 6, 2004

(65) Prior Publication Data

US 2005/0129329 A1 Jun. 16, 2005

(30) Foreign Application Priority Data

Dec. 11, 2003 (JP) ............................. 2003-413243

(51) Int. Cl.
*G06K 9/40* (2006.01)
(52) U.S. Cl. .................. 382/274; 348/246; 348/247
(58) Field of Classification Search ............... 348/246, 348/247; 382/274
See application file for complete search history.

(56) References Cited

U.S. PATENT DOCUMENTS

| | | | |
|---|---|---|---|
| 5,995,675 A | 11/1999 | Hwang | |
| 6,529,238 B1 * | 3/2003 | Mahant-Shetti et al. | 348/246 |
| 6,618,084 B1 * | 9/2003 | Rambaldi et al. | 348/247 |
| 6,683,643 B1 * | 1/2004 | Takayama et al. | 348/247 |
| 6,765,614 B1 * | 7/2004 | Matsukawa | 348/246 |
| 6,768,513 B1 * | 7/2004 | Watanabe et al. | 348/246 |
| 6,801,670 B2 * | 10/2004 | Kijima et al. | 382/274 |
| 6,806,902 B1 * | 10/2004 | Donovan | 348/246 |
| 7,133,072 B2 * | 11/2006 | Harada | 348/243 |
| 7,239,758 B2 * | 7/2007 | Tsuda | 382/275 |
| 7,257,270 B2 * | 8/2007 | Yamaguchi | 382/275 |

(Continued)

FOREIGN PATENT DOCUMENTS

| | | |
|---|---|---|
| CN | 1396764 | 2/2003 |
| JP | 09046601 | 2/1997 |

OTHER PUBLICATIONS

Chinese Office Action dated Aug. 18, 2006 with English translation.

(Continued)

*Primary Examiner*—Bhavesh M Mehta
*Assistant Examiner*—Sean Motsinger
(74) *Attorney, Agent, or Firm*—Dickinson Wright PLLC

(57) ABSTRACT

When charges Q (x, y) transferred from an image inputting device 1 are to be converted into first signal intensities S' (x, y) and signal processing is to be performed for the first signal intensity S' (x, y) of a particular pixel, a maximum value Smax, a minimum value Smin and an average value Save are calculated from signal intensities S' (x−1, y) and S' (x+1, y) at adjacent pixels. When S' (x, y)>Smax×A is satisfied, it is determined that the signal intensity S (x, y) at the particular pixel=Save×C (where A and C are coefficients), whereas when S' (x, y)<Smin×B is satisfied, it is determined that the signal intensity S (x, y)=Save×D (where B and D are coefficients), and processing is performed so as to obtain an appropriate intensity S (x, y). This makes it possible to accurately judge a defective pixel attributable to dirt adhering to a pixel array of the image inputting device, a crystal defect, etc., and compensate a defect in an image caused by the defective pixel.

3 Claims, 18 Drawing Sheets

U.S. PATENT DOCUMENTS

| | | | |
|---|---|---|---|
| 7,327,877 B2 * | 2/2008 | Kita | 382/167 |
| 2002/0131649 A1 * | 9/2002 | Yamaguchi | 382/275 |
| 2004/0012696 A1 * | 1/2004 | Teratani et al. | 348/246 |
| 2006/0007331 A1 * | 1/2006 | Izumi et al. | 348/246 |
| 2006/0221214 A1 * | 10/2006 | Yanof et al. | 348/246 |

OTHER PUBLICATIONS

Amended claims filed in response to the first office action in counterpart Chinese application No. 200410100269.3 with English translation.

Second office action of counterpart Chinese application No. 200410100269.3 with English translation, Jun. 2007.

Letters Patent of counterpart Korean application No. 2004-0103232, Nov. 2006.

Decision to Grant a Patent of counterpart Taiwanese Application No. 93137875.

Paragraphs 0013, 0018, 0022, 0023 and 0026 and JP 09-46601 and English translation of those paragraphs, 1997.

* cited by examiner

METHOD AND APPARATUS FOR CORRECTING PIXEL IMAGE SIGNAL INTENSITY

BACKGROUND OF THE INVENTION

1. Field of the Invention

The present invention relates to a signal processing method and an image capturing device for a signal output from an image inputting device which may typically be a CCD.

2. Background Art

During processing of a signal output from an image inputting device such as a CCD, a conventional signal processing method directly uses signals from photoelectric conversion elements called pixels which are formed by photodiodes or the like or uses signals obtained by converting these signals from analog to digital. The conventional signal processing method will be described with reference to FIGS. 13 through 17. FIGS. 13 through 17 show how light signals which are target image signals are transferred in turn until they are output to a display or storage device after input.

FIG. 13 is a conceptual drawing regarding the internal structure of an image capturing device, which is typically applied to a camera or the like, formed on a semiconductor substrate, showing an image inputting device 1 such as a CCD, an image processing device 2 which executes analog/digital conversion or the like for processing image signals output from the image inputting device 1, and a display or storage device 3 for image data. Plural photodiodes 11 which are photoelectric conversion devices are disposed inside the image inputting device 1, and each one has a coordinate (x, y). For simplicity, FIG. 13 shows areas at x=1 to 5 and y=1 to 5. In addition, there are plurality of vertical-direction charge transfer areas 12 for transferring charges in the vertical direction (the vertical direction in FIG. 13), and plurality of horizontal-direction charge transfer areas 13 for transferring charges in the horizontal direction (the horizontal direction in FIG. 13). Shown in FIG. 13 is a state that light signals corresponding to an image are input and in each photodiode 11, a signal charge because of light is generated, which means that charges denoted at Q (1, 1) through Q (5, 5) are generated in the photodiodes 11 which are located at the respective coordinates.

FIG. 14 shows a state that the charges in the photodiodes 11 have moved to the vertical-direction charge transfer areas 12. FIG. 15 shows a state that the charges in the vertical-direction charge transfer areas 12 have been transferred in the vertical direction and the charges generated in the photodiodes 11 expressed by the coordinates Y=1 have moved to the horizontal-direction charge transfer areas 13. FIG. 16 shows a state that the charges which used to exist in the horizontal-direction charge transfer areas 13 in FIG. 15 have been transferred, the charges Q have been converted into signal intensities S in the image processing device 2 and these signals have been fed to the display or storage device 3. FIG. 17 shows a state that as a result of repetition of the operation shown in FIGS. 15 and 16, all of the information in the photodiodes 11 has moved to the display or storage device 3. The conventional image capturing device operates as described above.

However, in the conventional structure, when very small dirt 21 has adhered to the photodiodes section, e.g., at the pixel which is at the coordinate (2, 2) shown in FIG. 13, the charge at this position alone becomes extremely small as compared to the surrounding charges and therefore appears as a black spot on a screen as shown in FIG. 18(a). Meanwhile, in the event that a crystal defect 22 of the semiconductor substrate is located at the pixel at the coordinate (4, 4) shown in FIG. 13 in the photodiodes section, since a leak current develops even in the absence of light, and the charge at this position alone becomes extremely large as compared to the surrounding charges and therefore appears as a white spot on the screen as shown in FIG. 18(b). These become visible on the screen, which is not a sufficient capability as an image inputting device and causes deterioration of a manufacturing yield of image inputting devices. While a solution to this problem has been dirt reduction, crystal defect suppression and the like during manufacturing steps, this makes the manufacturing steps complex or necessitates use of expensive manufacturing equipment, and eventually serves as a restriction against a reduction of a cost of manufacturing the image inputting devices.

As a solution to the challenges regarding defects described above, Japanese Patent Application Laid-Open Gazette No. H9-46601 describes a method of determining whether there is a defect or not by comparing a pixel signal corresponding to each pixel with an average value of the pixel signals surrounding this pixel. However, since this method requires comparison with the average value, when a noise level of the peripheral pixels as a whole varies, a decision regarding whether there is a defect may become different depending upon the noise level. Further, there is a problem that in the case of an image in which signal intensities sharply change between adjacent pixels, any area having a comparable signal intensity to the signal intensity of a particular pixel which is a boundary where signal intensities change is erroneously decided as a defect because the signal intensity of the particular pixel is greatly different from an average value of plurality of pixels, and that signal intensity compensation is performed based on this decision and it becomes difficult to enhance a resolution such as a contrast.

SUMMARY OF THE INVENTION

The present invention is for solving the problems with the conventional techniques, and provides a signal processing method and an image signal capturing device with which it is possible to accurately determine a defective pixel owing to dirt, a crystal defect or the like and compensate a defect in an image attributed to the defective pixel.

Signal processing methods and image signal capturing devices according to the present invention to solve the problems above comprise the following major means.

The first signal processing method according to the present invention is a signal processing method which comprises, for calculation of an image signal intensity by processing image signals from pixels sequentially output from an image inputting device in which plural pixels for photoelectric conversion of incident light are arranged in the horizontal direction and the vertical direction: a first step of calculating a maximum value, a minimum value and an average value of image signal intensities of plural pixels which are arranged around a certain pixel; and a second step of executing correction of the image signal intensity of the certain pixel based on the average value when the image signal intensity of the certain pixel is larger than a value which is calculated by multiplying the maximum value by a first coefficient or smaller than a value which is calculated by multiplying the minimum value by a second coefficient.

According to the present invention, since the image signal intensity of the certain pixel is compared with the value which is calculated by multiplying the maximum value of the image signal intensities of the surrounding pixels by the first coefficient (first comparison value), when the image signal intensity of the certain pixel is larger than the first comparison value, it is accurately determined that the certain pixel is a defective pixel because of a crystal defect or the like created in a substrate of a pixel array of the image inputting device, and as the image signal intensity of this defective pixel is corrected based on the average value of the image signal intensities of the surrounding pixels, a defect in an image caused by the defective pixel is compensated.

In addition, since the image signal intensity of the certain pixel is compared with the value which is calculated by multiplying the maximum value of the image signal intensities of the surrounding pixels by the second coefficient (second comparison value), when the image signal intensity of the certain pixel is smaller than the second comparison value, it is accurately determined that the certain pixel is a defective pixel because of dirt or the like adhering on the pixel array of the image inputting device, and as the image signal intensity of this defective pixel is corrected based on the average value of the image signal intensities of the surrounding pixels, a defect in an image caused by the defective pixel is compensated.

As described above, comparison of the signal intensity of a particular pixel (a certain pixel) with a value based on a maximum value, a minimum value or the like of the signal intensities of the surrounding pixels permits easy and accurate recognition and extraction of a defective pixel without fail, and as the signal intensity of the defective pixel is replaced with a signal which is calculated from an average value of the signal intensities of the surrounding pixels, a defect is compensated and eliminated from a displayed image. Further, it is possible to suppress complication of manufacturing steps in the image inputting device for dirt reduction, crystal defect suppression and the like and to suppress use of expensive manufacturing equipment which are exercised in the conventional techniques, and therefore, it is possible to use an inexpensive image inputting device.

In this first signal processing method, at the second step, the correction may be executed by replacing the image signal intensity of the certain pixel with a value which is calculated by multiplying the average value by a third coefficient.

The second signal processing method according to the present invention is a signal processing method which comprises, for calculation of an image signal intensity by processing image signals from pixels sequentially output from an image inputting device in which plural pixels for photoelectric conversion of incident light are arranged in the horizontal direction and the vertical direction: a first step of ensuring that a light signal is not input substantially to the image inputting device and calculating a maximum value of image signal intensities of plural pixels which are arranged around a certain pixel; a second step of storing position information regarding the certain pixel within the pixel arrangement when the image signal intensity of the certain pixel as it is substantially without a light signal input to the image inputting device is larger than a value which is calculated by multiplying the maximum value by a first coefficient; a third step of calculating, upon inputting of image light signals to the image inputting device, an average value of image signal intensities of plural pixels which are arranged around the certain pixel whose position information is stored at the second step; and a fourth step of replacing the image signal intensity of the certain pixel, whose position information is stored at the second step and which is among image signal intensities which are calculated upon inputting of image light signals to the image inputting device, with a value which is calculated by multiplying the average value, which is calculated at the third step, by a second coefficient.

In this second signal processing method, the plural pixels regarding which the maximum value of image signal intensities is calculated at the first step and which are arranged around the certain pixel and the plural pixels regarding which the average value of image signal intensities is calculated at the third step and which are arranged around the certain pixel may be pixels which are output before the certain pixel in the order of outputting image signals from the image inputting device.

In this second signal processing method, the first step and the second step may be executed at the time that the image inputting device is turned on.

The third signal processing method according to the present invention is a signal processing method which comprises, for calculation of an image signal intensity by processing image signals from pixels sequentially output from an image inputting device in which plural pixels for photoelectric conversion of incident light are arranged in the horizontal direction and the vertical direction: a first step of ensuring that substantially uniform light signals are input to the image inputting device and calculating a minimum value of image signal intensities of plural pixels which are arranged around a certain pixel; a second step of storing position information regarding the certain pixel within the pixel arrangement when the image signal intensity of the certain pixel as it is with substantially uniform light signals input to the image inputting device is smaller than a value which is calculated by multiplying the minimum value by a first coefficient; a third step of calculating, upon inputting of image light signals to the image inputting device, an average value of image signal intensities of plural pixels which are arranged around the certain pixel whose position information is stored at the second step; and a fourth step of replacing the image signal intensity of the certain pixel, whose position information is stored at the second step and which is among image signal intensities which are calculated upon inputting of image light signals to the image inputting device, with a value which is calculated by multiplying the average value, which is calculated at the third step, by a second coefficient.

In this third signal processing method, the plural pixels regarding which the minimum value of image signal intensities is calculated at the first step and which are arranged around the certain pixel and the plural pixels regarding which the average value of image signal intensities is calculated at the third step and which are arranged around the certain pixel may be pixels which are output before the certain pixel in the order of outputting image signals from the image inputting device.

In this third signal processing method, the first step and the second step may be executed at the time that the image inputting device is turned on.

In the first through the third signal processing methods, the image signal intensities may be chrominance signal intensities of at least one type, or alternatively, the image signal intensities may be the sums of plural chrominance signal intensities.

The first image capturing device is an image capturing device comprising an image inputting device in which plural pixels for photoelectric conversion of incident light are arranged in the horizontal direction and the vertical direction, a signal processing device which calculates an image signal intensity by processing image signals from pixels sequentially output from the image inputting device, and an image display device or an image storage device which receives the image signal intensity calculated by the signal processing device, wherein the signal processing device is equipped with a function of calculating a maximum value, a minimum value and an average value of image signal intensities of plural pixels which are arranged around a certain pixel and correcting the image signal intensity of the certain pixel based on the average value when the image signal intensity of the certain pixel is larger than a value which is calculated by multiplying the maximum value by a first coefficient or smaller than a value which is calculated by multiplying the minimum value by a second coefficient.

The second image capturing device is an image capturing device comprising an image inputting device in which plural pixels for photoelectric conversion of incident light are arranged in the horizontal direction and the vertical direction, a position information storage device which stores position information of a pixel inside the image inputting device, a signal processing device which calculates an image signal intensity by processing image signals from pixels sequentially output from the image inputting device, and an image display device or an image storage device which receives the image signal intensity calculated by the signal processing device, wherein the signal processing device is equipped with: a function of ensuring that a light signal is not input substantially to the image inputting device, calculating a maximum value of image signal intensities of plural pixels which are arranged around a certain pixel, and storing position information of the certain pixel within the pixel arrangement in the position information storage device when the image signal intensity of the certain pixel is larger than a value which is calculated by multiplying the maximum value by a first coefficient; and a function of calculating, upon inputting of image light signals to the image inputting device, an average value of image signal intensities of plural pixels which are arranged around the certain pixel whose position information is stored in the position information storage device, and replacing the image signal intensity of the certain pixel, whose position information is stored in the position information storage device and which is among image signal intensities which are calculated upon inputting of image light signals to the image inputting device, with a value which is calculated by multiplying the average value by a second coefficient.

The third image capturing device is an image capturing device comprising an image inputting device in which plural pixels for photoelectric conversion of incident light are arranged in the horizontal direction and the vertical direction, a position information storage device which stores position information of a pixel inside the image inputting device, a signal processing device which calculates an image signal intensity by processing image signals from pixels sequentially output from the image inputting device, and an image display device or an image storage device which receives the image signal intensity calculated by the signal processing device, wherein the signal processing device is equipped with: a function of ensuring that substantially uniform light signals are input to the image inputting device, calculating a minimum value of image signal intensities of plural pixels which are arranged around a certain pixel, and storing position information of the certain pixel within the pixel arrangement in the position information storage device when the image signal intensity of the certain pixel is smaller than a value which is calculated by multiplying the minimum value by a first coefficient; and a function of calculating, upon inputting of image light signals to the image inputting device, an average value of image signal intensities of plural pixels which are arranged around the certain pixel whose position information is stored in the position information storage device, and replacing the image signal intensity of the certain pixel, whose position information is stored in the position information storage device and which is among image signal intensities which are calculated upon inputting of image light signals to the image inputting device, with a value which is calculated by multiplying the average value by a second coefficient.

DETAILED DESCRIPTION OF THE PREFERRED EMBODIMENTS

Embodiments of the present invention will now be described with reference to the associated drawings.

First Embodiment

Figure 1:
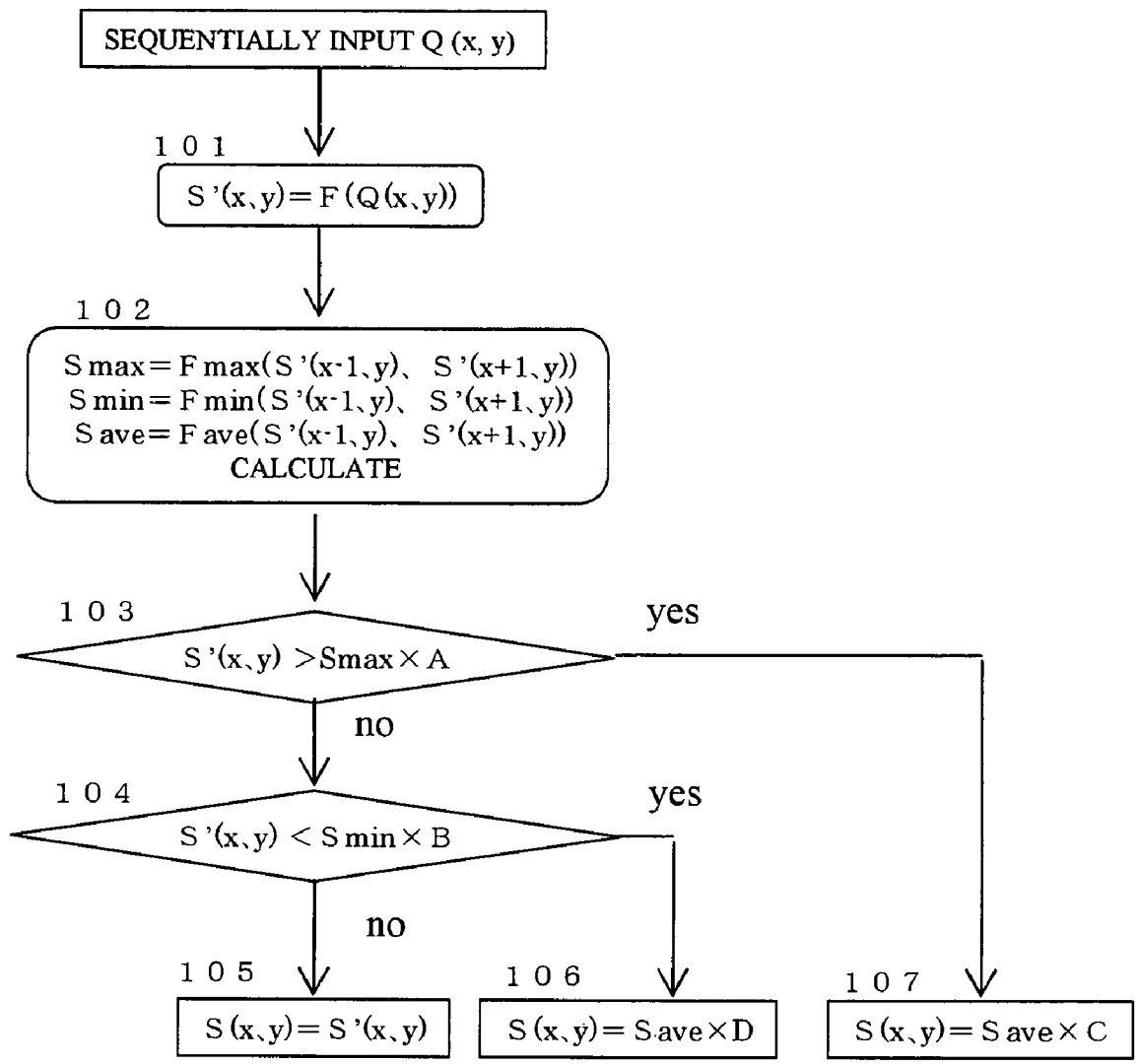
FIG. 1 is a flow chart of signal processing of an image signal according to a first embodiment of the present invention.
Figure 2:
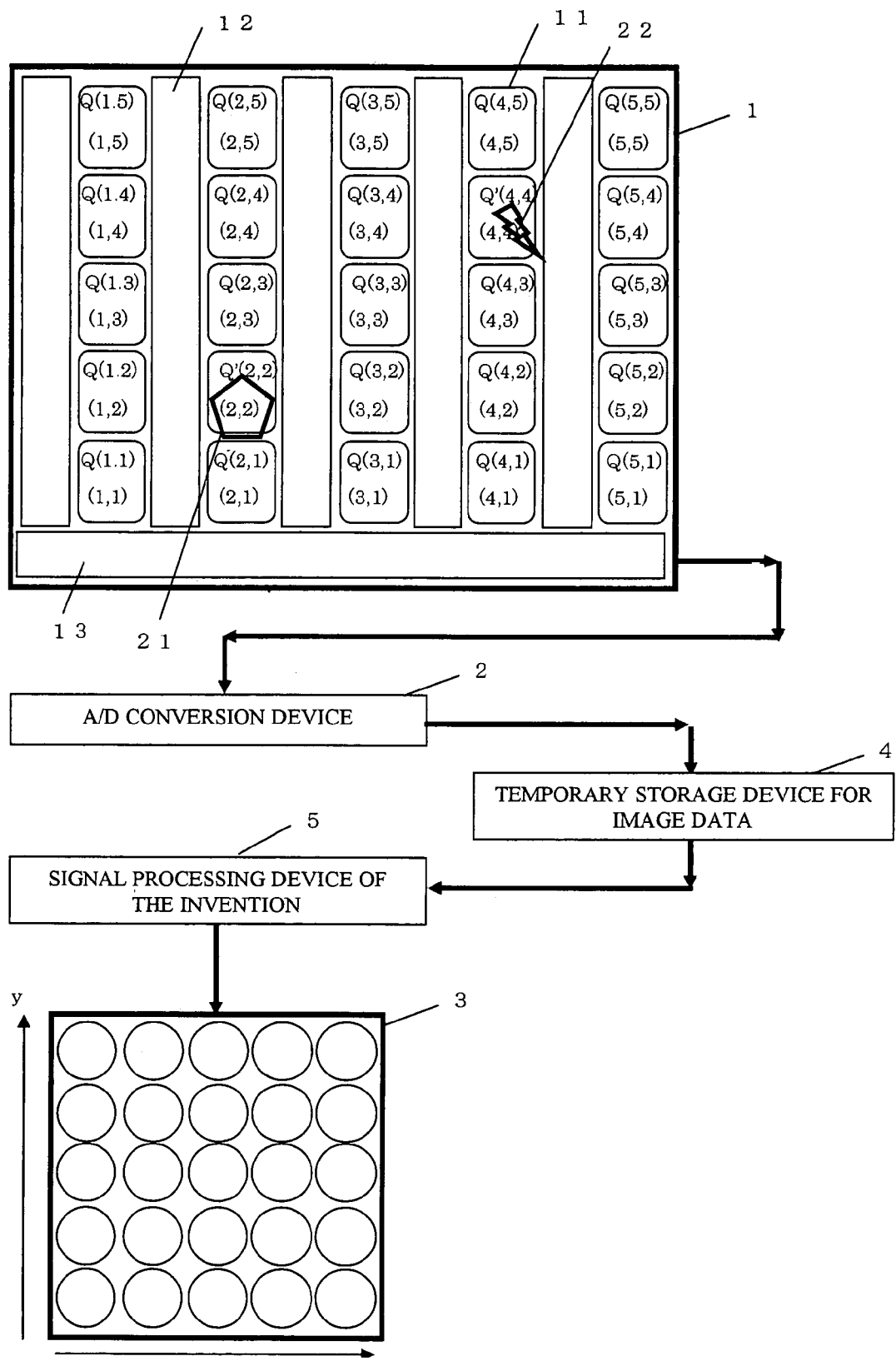
FIG. 2 is a drawing which shows the internal structure of an image capturing device and a flow of an image signal charge according to the first embodiment of the present invention.

FIG. 1 shows the flow of processing image signals output from an image inputting device according to the first embodiment of the present invention. In this example, the flow illustrates a process of transferring light signals from the image inputting device to a display or storage device, which will be described later. FIG. 2 is a conceptual view of the internal structure of an image capturing device which is typically a camera or the like, comprises an image inputting device 1 such as a CCD, an image signal processing device 2 which executes analog/digital conversion or the like, a temporary storage device 4 for image data and an image signal processing device 5 and a display or storage device 3 for image data, and is characterized that the image signal processing device 5 is disposed. Plural photodiodes 11 which are photoelectric conversion devices are disposed inside the image inputting device 1, and each one has a coordinate (x, y). For simplicity, these drawings shows areas at x=1 to 5 and y=1 to 5. In addition, there are plurality of vertical-direction charge transfer areas 12 for transferring charges in the vertical direction (the vertical direction in FIG. 1), and plurality of horizontal-direction charge transfer areas 13 for transferring charges in the horizontal direction (the horizontal direction in FIG. 1).

An operation of the image capturing device according to this embodiment will now be described with reference to FIGS. 2 through 6. Shown in FIGS. 2 through 6 is a process from inputting of light signals expressing an image to outputting of the light signals to the display or storage device 3.

First, FIG. 2 shows a state that light signals expressing an image are input and a charge is generated at each photodiode 11, which means that there are charges denoted at Q (1, 1) through Q (5, 5) are generated in the photodiodes 11 which are at the respective coordinates.

An example is now assumed that very small dirt 21 has adhered to the photodiode 11 located at the coordinate (2, 2) and a crystal defect 22 in a semiconductor substrate is located under the photodiode 11 which is at the coordinate (4, 4). The dirt 21 blocks light incident upon the photodiode 11 located at the coordinate (2, 2) and permits generation of only an extremely small charge Q' (2, 2) as compared to a charge Q (2, 2) which is supposed to be generated, whereas from an area electrically connected to the photodiode 11 which is at the coordinate (4, 4), an electron flows into the photodiode 11 at the coordinate (4, 4), thereby generating an extremely large charge Q' (4,4) as compared to a charge Q (4, 4) which is supposed to be generated.

Figure 3:
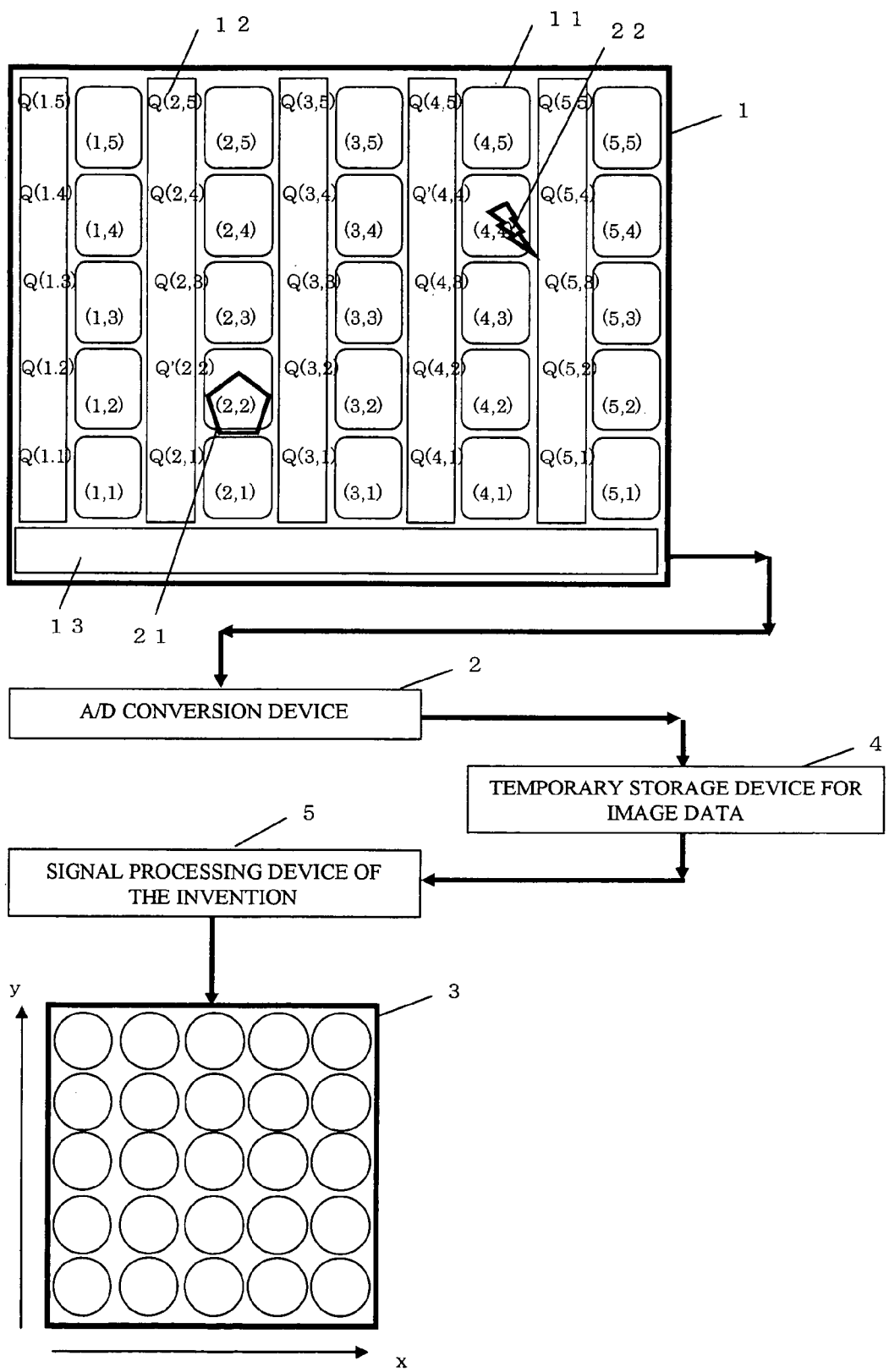
FIG. 3 is a drawing which shows the internal structure of the image capturing device and a flow of an image signal charge according to the first embodiment of the present invention.
Figure 4:
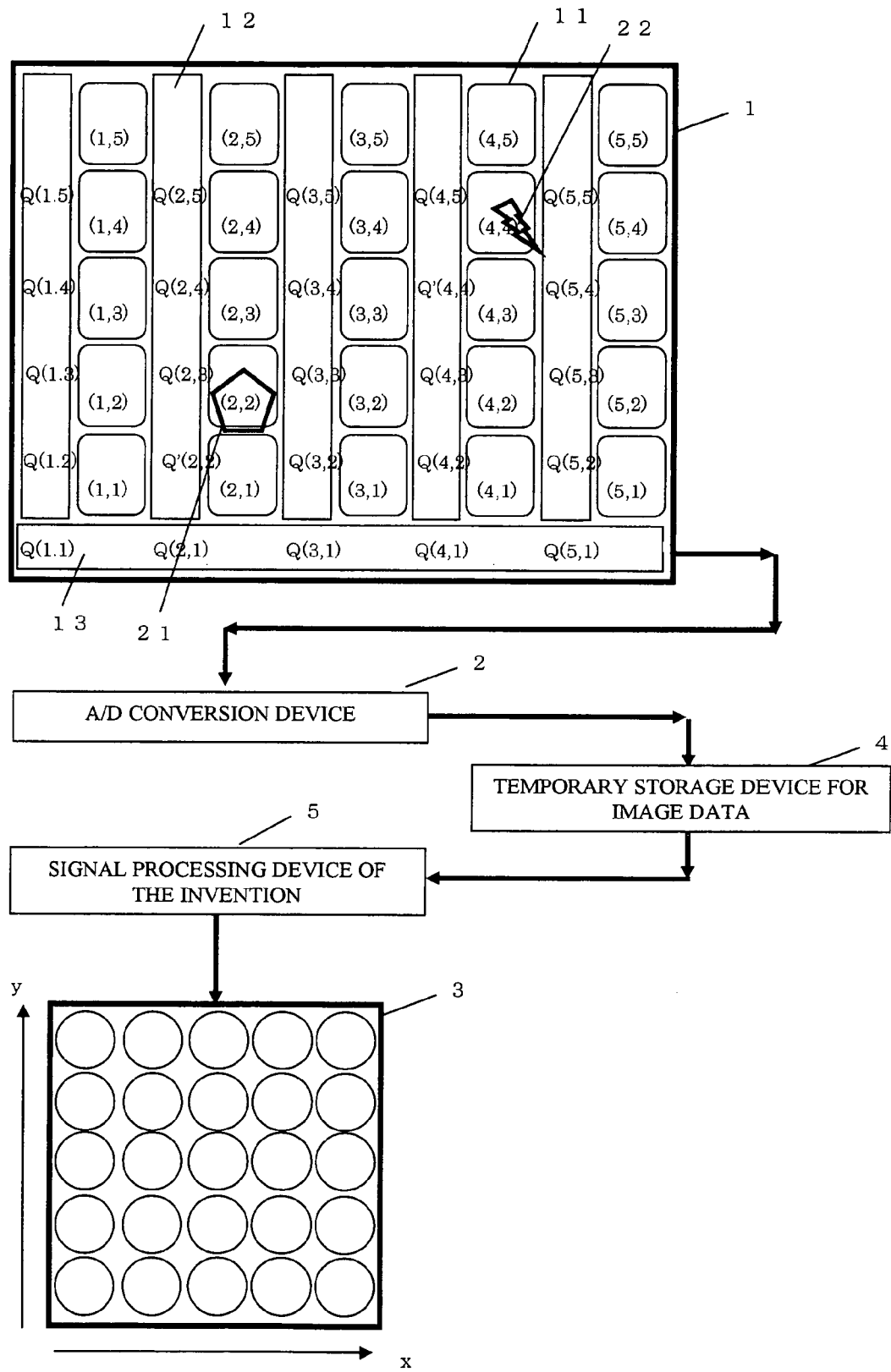
FIG. 4 is a drawing which shows the internal structure of the image capturing device and the flow of an image signal charge according to the first embodiment of the present invention.
Figure 5:
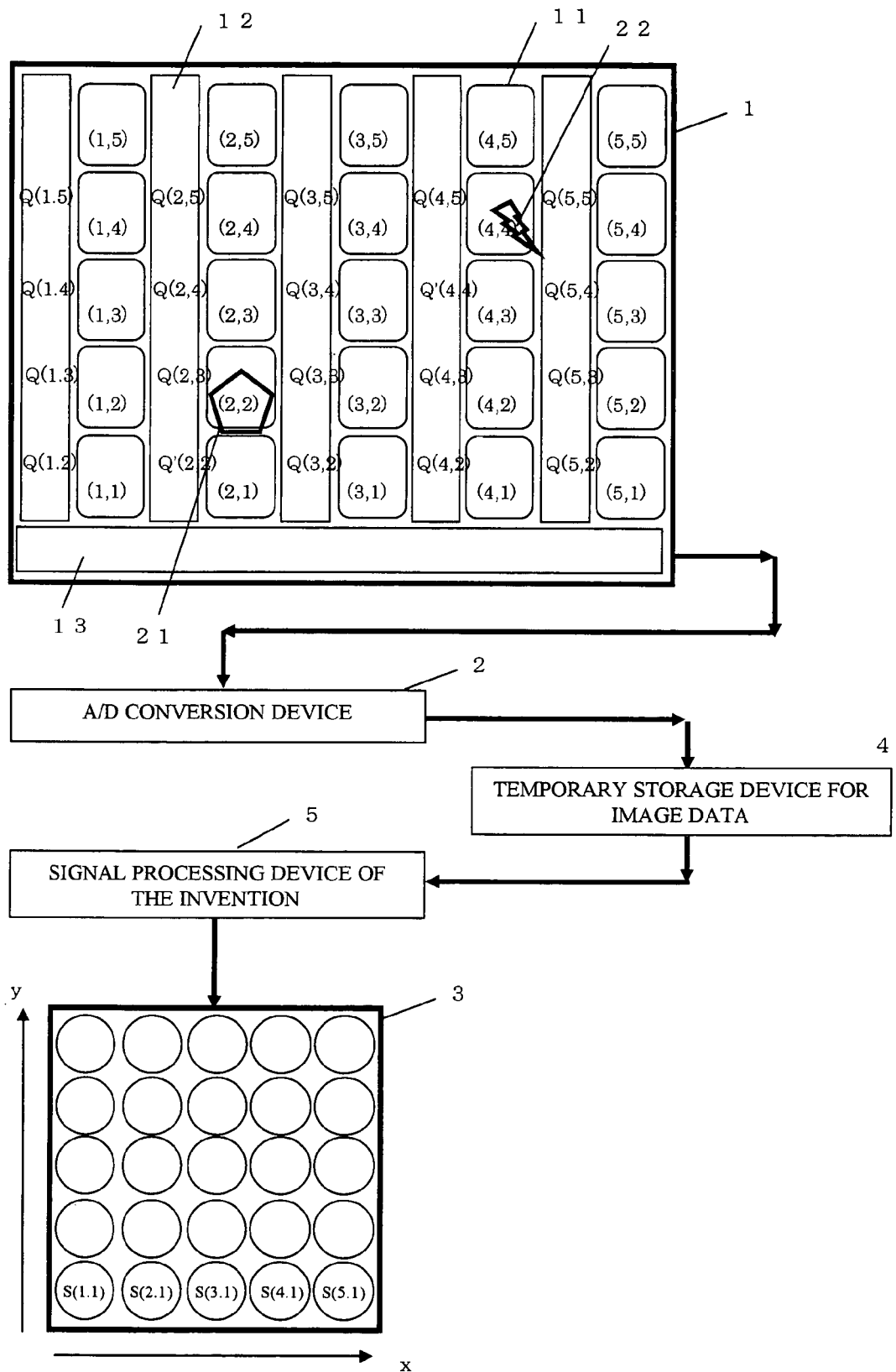
FIG. 5 is a drawing which shows the internal structure of the image capturing device and the flow of an image signal charge according to the first embodiment of the present invention.

FIG. 3 shows a state that charges (electrons) in the photodiodes 11 have moved to the vertical-direction charge transfer areas 12. FIG. 4 shows a state that the charges in the vertical-direction charge transfer areas 12 have been transferred in the vertical direction and electrons generated in all photodiodes 11 which are at the coordinates y=1 have moved to the horizontal-direction charge transfer areas 13. In FIG. 5, electrons which used to exist in the vertical-direction charge transfer areas 12 in FIG. 4 have been transferred, converted from the charges Q (x, y) to first signal intensities S' (x, y) while going through the image processing device 2 (analog/digital conversion device), fed to the temporary storage device 4, converted from the first signal intensities S' (x, y) into second signal intensities S (x, y) while going through the signal processing device (defect compensation device) 5, and then fed to an image display device or the storage device 3.

A signal processing flow in the signal processing device 5 which is a defect compensation device will be described in detail with reference to FIG. 1. FIG. 1 also shows processing inside the image processing device 2. The function F described as Step 101 in FIG. 1 is a function for conversion of the charges Q (x, y) transferred from the image inputting device 1 into the first signal intensities S' (x, y), which processing is the processing inside the image processing device 2. After this, the first signal intensities S' (x, y) are fed to the signal processing device 5 through the temporary storage device 4, and the processing from Step 102 to Step 107 is executed.

In the signal processing device 5, as denoted at Step 102, in the event that signal processing of the first signal intensity S' (x, y) corresponding to a particular pixel is to be performed, a maximum value Smax is calculated from the signal intensities S' (x−1, y) and S' (x+1, y) which correspond to neighboring pixels. The function Fmax used here is a function for calculating a maximum value from signal intensities which are fed. Next, a minimum value Smin is calculated from the signal intensities S' (x−1, y) and S' (x+1, y) which correspond to the same neighboring pixels. The function Fmin used here is a function for calculating a minimum value from signal intensities which are fed. Further, an average value Save of the neighboring signal intensities S' (x−1, y) and S' (x+1, y) is calculated from these signal intensities S' (x−1, y) and S' (x+1, y). The function Fave used here is a function for calculating an average value from signal intensities which are fed.

This is followed by comparison of the signal intensity S' (x, y) corresponding to the particular pixel with an intensity which is calculated by multiplying the maximum value Smax by a certain coefficient A (Step 103), and when S' (x, y)>Smax×A is satisfied, it is determined that the signal intensity S (x, y) at the particular pixel=Save×C (Step 107). The symbol C is a coefficient which has been determined in advance. When the signal intensity S' (x, y) is found to be too large as a result of this processing, the signal intensity is suppressed down to an appropriate intensity S (x, y). On the contrary, when S' (x, y)≦Smax×A is satisfied, the signal intensity S' (x, y) is compared with an intensity which is calculated by multiplying the minimum value Smin by a certain coefficient B (Step 104), it is determined that the signal intensity S (x, y)=Save×D (Step 106) when S' (x, y)<Smin×B is satisfied. When S' (x, y)≧Smin×B, it is determined that the signal intensity S (x, y)=S' (x, y) (Step 105). The symbol D is a coefficient which has been determined in advance. This is the processing executed by the signal processing device 5.

Figure 7A:
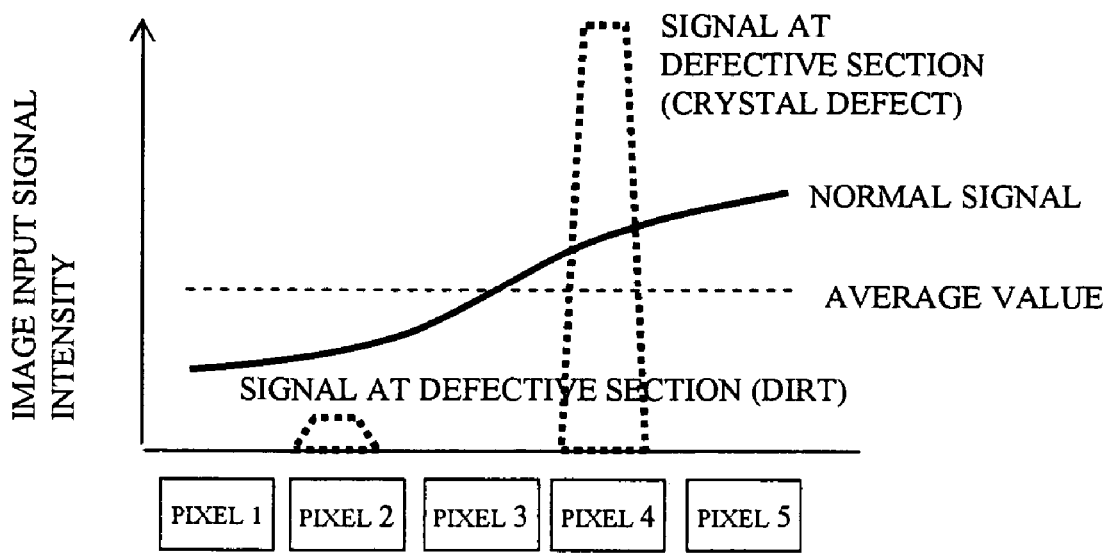
FIG. 7 is a drawing of a one-dimensional distribution of image signal intensities.
Figure 7B:
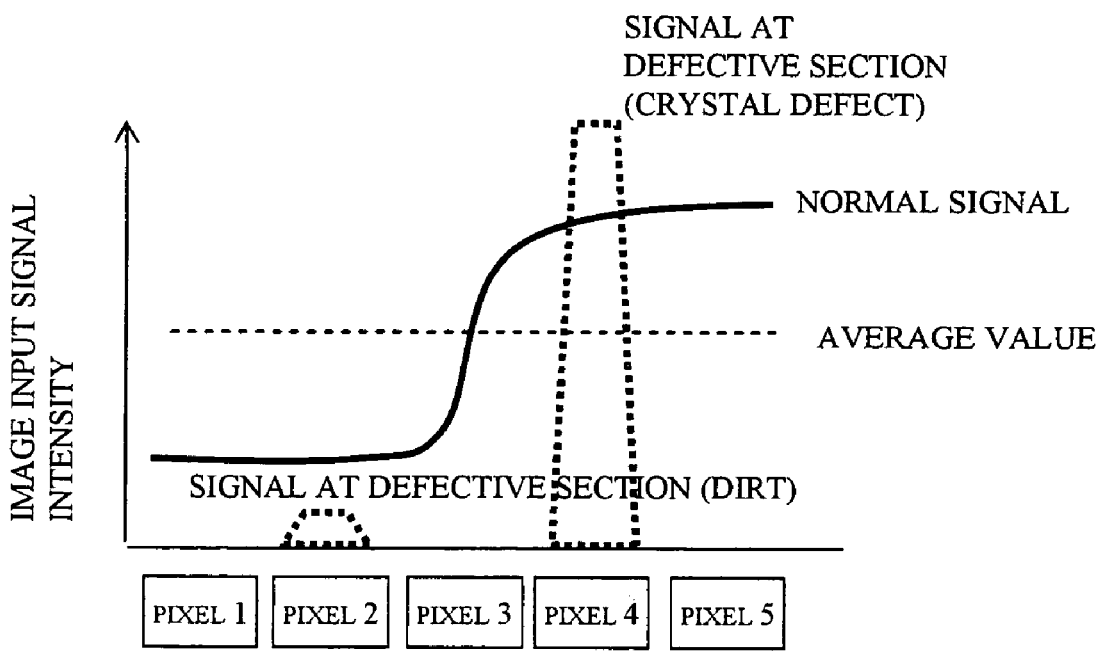

A fact that the signal processing method above realizes compensation of a defect in an image will now be described with reference to FIG. 7. While an ordinary image signal representing the nature gradually changes as shown in FIG. 7(a) or gives rise to an abrupt change at the position of a certain pixel which is followed by plurality of pixels having similar intensities as shown in FIG. 7(b), a solid imager such as a CCD has hundred thousand or more pixels and usually will not find only one pixel having an exceptionally larger or smaller signal intensity as compared to surrounding pixels. From this, when the signal intensity at a particular pixel is larger or smaller than any one of surrounding pixels, that pixel is recognized as a defect. This is clear from comparison of the normal signal curve (solid line) with defective pixels (pixels 2 and 4) in FIG. 7. However, since variations arising during manufacturing and various noises are differently present in different pixels, simple comparison of signal intensities may result in recognition of a normal signal as a defect. With coefficients as those described with reference to FIG. 1 set freely considering variations between pixels, noise levels, etc., the accuracy of defects recognition improves, thereby making it possible to obviate false recognition of a defect. This applies to two-dimensional signal intensity changes, although FIG. 7 shows signal intensity changes in a one-dimensional direction.

Figure 6:
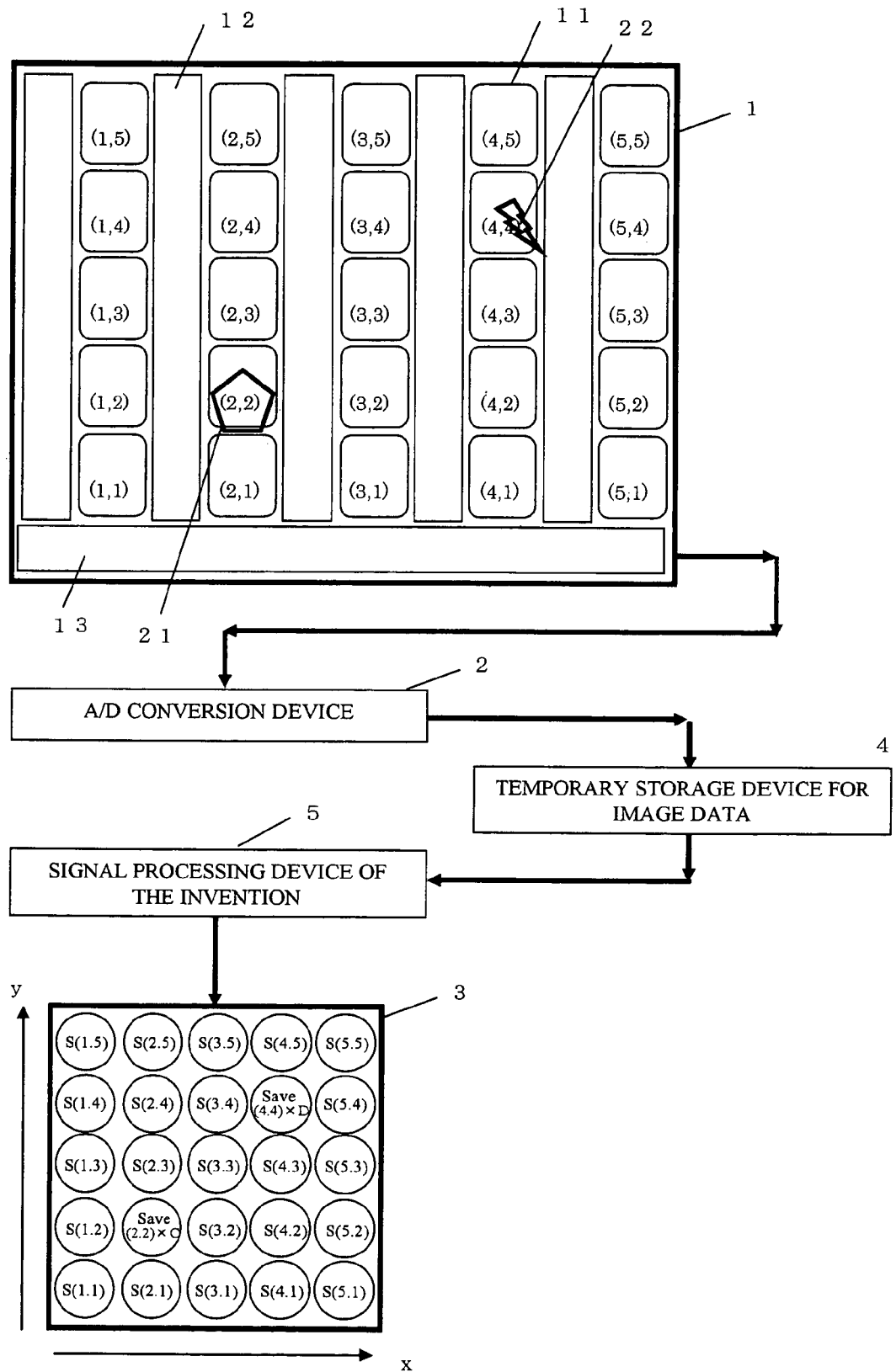
FIG. 6 is a drawing which shows the internal structure of the image capturing device and the flow of an image signal charge according to the first embodiment of the present invention.

FIG. 6 shows a state that all of the information in the photodiodes 11 has moved to the display or storage device 3 after repetition of the operation shown in FIGS. 4 and 5. As a result of the signal processing according to the present invention shown in FIG. 1, the extremely small charge Q' (2, 2) generated by the photodiode 11 located at the coordinate (2, 2) is usually smaller than the minimum value of the neighboring signal intensities, and therefore, it is determined S (2, 2)=Save×D, whereas the extremely large charge Q' (4, 4) generated by the photodiode 11 located at the coordinate (4, 4) is usually larger than the maximum value of the neighboring signal intensities, and therefore, it is determined S (4, 4)=Save×C. The particular image signal owing to the deficiency of the photodiode consequently becomes the average of the adjacent signal intensities or close to the average, and therefore, will not appear as a defect on a screen.

While this embodiment requires use of the signals (x+1, y) and (x−1, y) at pixels on the right-hand side and the left-hand side to the particular pixel (x, y) during the processing executed by the signal processing device 5, signals expressing pixels (x+n, y+m) (where n and m are real numbers including negative numbers) may of course be used instead.

The coefficients A and B can be determined based on manufacturing-induced variations among the respective photodiodes or transfer areas, etc. For instance, the coefficient A may be determined from variations of the signal intensities among the pixels which are obtained during the operation with uniform light impinging upon all pixels. In this case, the signal intensity distribution is usually a normal distribution, and hence, the coefficient A may be a value which is calculated by dividing $\sigma$, which is yielded from the distribution, by an average value or a median value, and it is desirable that A=1+$\sigma$/average value (or median value). Meanwhile, the coefficient B may be determined from variations of the signal intensities among the pixels which are obtained during the operation without incident light. In this case, the logarithm of the signal intensities defines a normal distribution, and hence, the coefficient B may be a value which is calculated by dividing $\sigma$, which is yielded from the distribution, by an average value or a median value, and it is desirable that B=1−$\sigma$/average value (or median value). Of course, $\sigma$ may be replaced with 3$\sigma$ or other value.

Appropriate values of the coefficients C and D change depending upon the application of the image capturing device, etc. Hence, it is necessary to set the coefficients properly based on a sensitivity test which uses actual defects, e.g., with defects created intentionally. However, in general, when a defect-corrected coordinate is brighter than surrounding coordinates (i.e., has a stronger signal intensity), people tend to be too sensitive to this coordinate, whereas when this coordinate is darker, people tend to be too insensitive to this coordinate. The coefficients C and D are therefore preferably from 1 to about 0.5. In addition, since a brighter coordinate rather than darker coordinate tends to be recognized as a difference when signal intensity differences are at similar levels, the coefficient C is preferably from 1 to about 0.8 and the coefficient D is preferably from 0.8 to about 0.5.

Second Embodiment

Figure 8A:
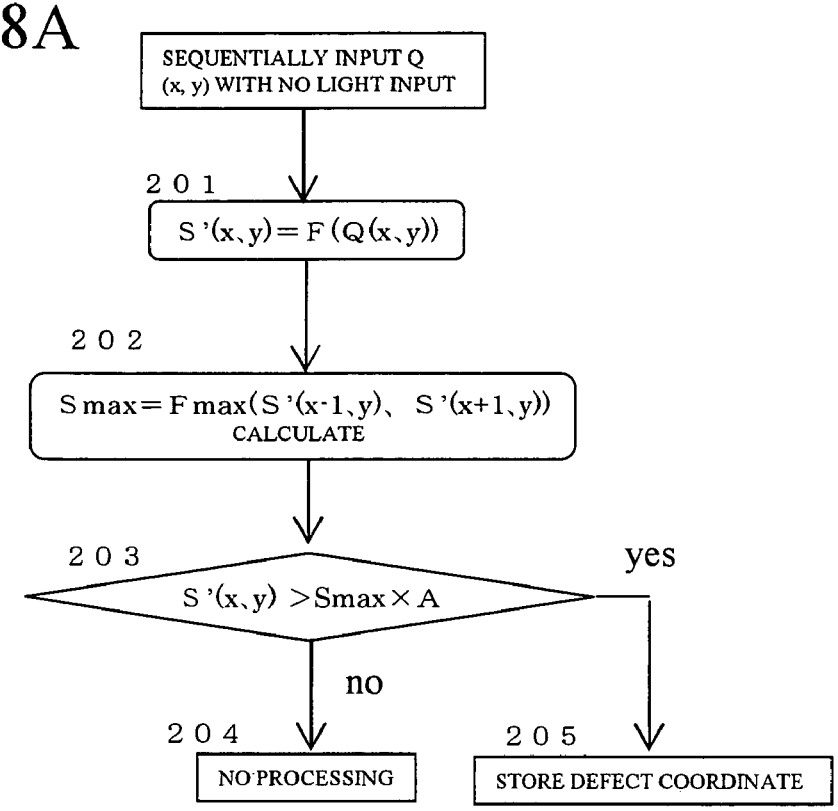
FIG. 8 is a flow chart of signal processing of an image signal according to a second embodiment of the present invention.
Figure 8B:
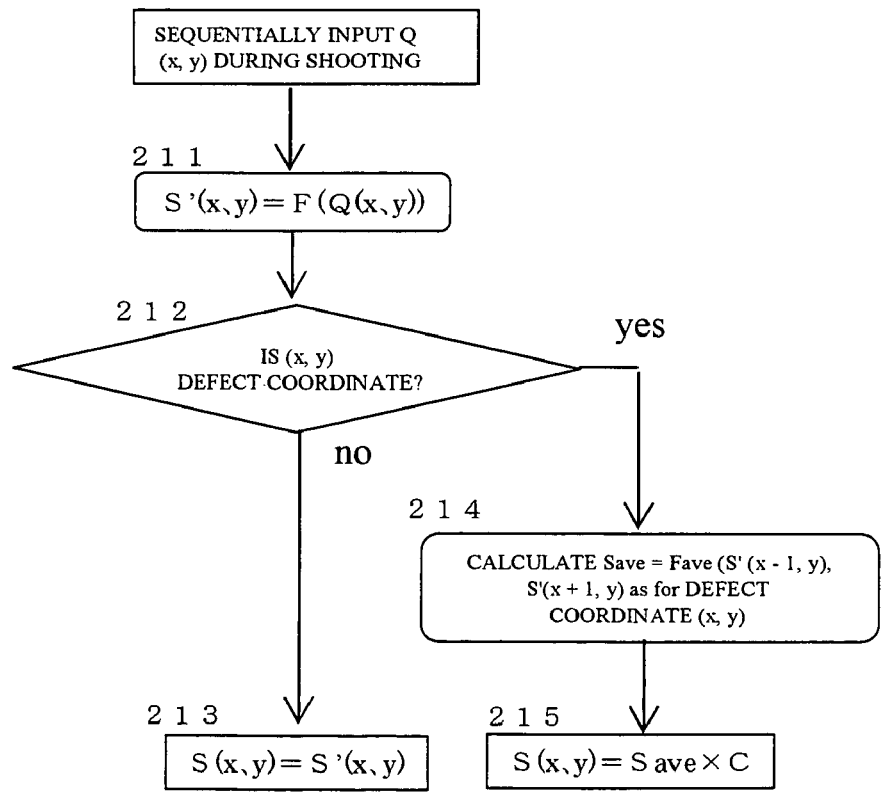
Figure 9:
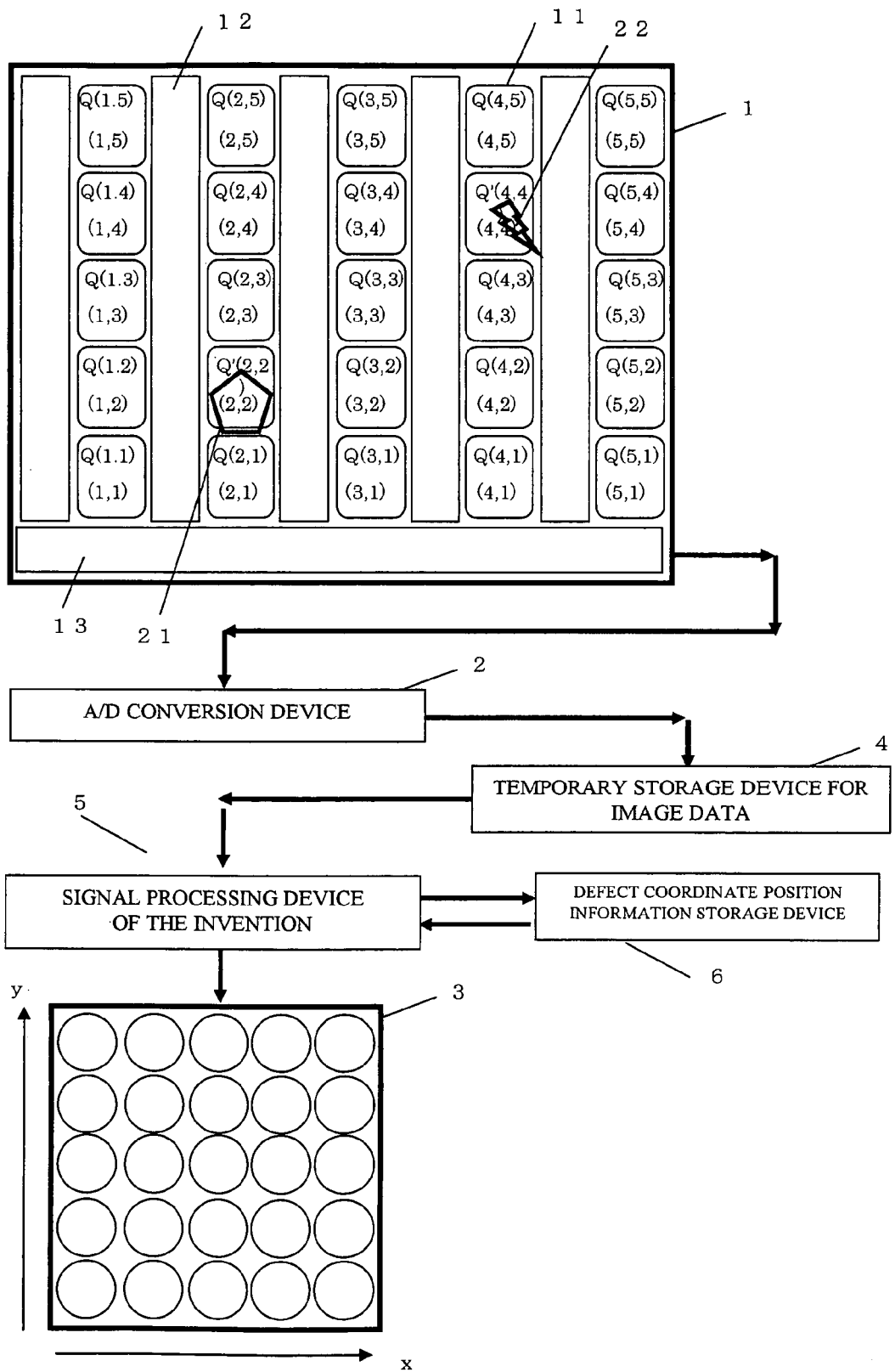
FIG. 9 is a drawing which shows the internal structure of an image capturing device and a flow of an image signal charge according to a second through a fifth embodiments of the present invention.

FIG. 8 shows the flow of processing an image signal within an image capturing device according to the second embodiment of the present invention, while FIG. 9 is a conceptual view of the internal structure of the image capturing device which is typically a camera or the like. In FIG. 9, a defect position information storage device 6, which stores information indicative of the coordinate of a defective pixel recognized by the signal processing device 5, is added to the structure of the image capturing device according to the first embodiment. Coefficients A and C used in the second embodiment are similar to the coefficients A and C which are used in the first embodiment.

An image defect processing method according to the second embodiment first requires operating the image inputting device 1 and the like in a condition that the image capturing device shown in FIG. 9 receives no light signal (i.e., a condition that there is no incident light), as shown in the flow chart in FIG. 8(a). In this condition, charge quantities Q (x, y) as they are without any light input from the pixels at the respective coordinates (x, y) are fed from the image inputting device 1 to the image processing device 2 which executes analog/digital conversion and converted into the signal intensities S' (x, y) (Step 201), and the respective signal intensities S' (x, y) are fed to the signal processing device 5 through the temporary storage device 4. In this case, an image intensity signal output from any defect-free pixel is supposed to be equal to or smaller than a manufacturing-induced variation, a noise level, etc.

That is, a signal intensity at a normal pixel is sufficiently smaller than a large signal intensity attributed to the crystal defect 22 shown in FIG. 9. Hence, the signal intensity at a pixel which gives rise to a large signal intensity because of the crystal defect 22 is larger than the maximum value Smax of the signal intensities at the surrounding pixels, and it is therefore possible to easily and accurately recognize that there is a defect. Noting this, in the signal processing device 5, with respect to each pixel, the maximum value Smax of the signal intensities at the surrounding pixels is calculated (Step 202), the signal intensity S' (x, y) at this pixel is compared with a value which is calculated by multiplying the maximum value Smax by the coefficient A (Step 203), and when S' (x, y)>Smax×A is satisfied, this pixel is recognized as a defect and coordinate information regarding this pixel is stored in the defect position information storage device 6 (Step 205).

Upon storage of the position of the defective pixel, when the image capturing device is to be actually used for shooting, as the flow chart in FIG. 8(b) shows, charge quantities Q (x, y) at the respective coordinates (x, y) are fed from the image inputting device 1 to the image processing device 2 in a condition that light corresponding to an image is input to the image inputting device 1 and then converted into the signal intensities S' (x, y) (Step 211), and the respective signal intensities S' (x, y) are fed to the signal processing device 5 through the temporary storage device 4. In the signal processing device 5, only as for the pixel which corresponds to the defect coordinate stored in the defect position information storage device 6, the average value Save of signals from the surrounding pixels is calculated and the pixel corresponding to the defect coordinate is replaced with a value which is calculated by multiplying the average value Save by the coefficient C (Step 212, Step 214, Step 215), those which are not defect coordinates are determined as the signal intensities S (x, y)=S' (x, y) (Step 212, Step 213), and these are fed to the image display device or the storage device 3. Defects in the image are compensated and eliminated in this manner.

Since an ordinary signal representing the nature usually will not find only one pixel exceptionally larger or smaller than pixels around this pixel as shown in FIG. 7, when an average signal representing the surrounding positions is used for the position of a defect which is stored, the continuity with the surrounding positions is maintained. This defect therefore will not show as a defect in an image.

Defect compensation is thus realized through signal processing of only a particular defective pixel, i.e., achieved even the computing capability of the signal processing device is insufficient unlike the signal processing of all pixels according to the first embodiment, which improves the processing speed. Further, it is possible to compensate defects created after manufacturing as well which are for example defects originating from crystal defects or the like which develop with time owing to voltage application after the image inputting device 1 is built in equipment, not to mention defects created within the image inputting device 1 during manufacturing.

Clearly, the number n of surrounding pixels for calculation of the average value Save may be n=1, that is, use of adjacent pixels alone, or alternatively n=a plural number, which is use of signals from many pixels.

Third Embodiment

FIG. 10 shows the flow of processing an image signal output from an image capturing device according to the third embodiment of the present invention. The structure of the image capturing device is the same as that shown in FIG. 9. Coefficients B and D used in the third embodiment are similar to the coefficients B and D which are used in the first embodiment.

Figure 10A:
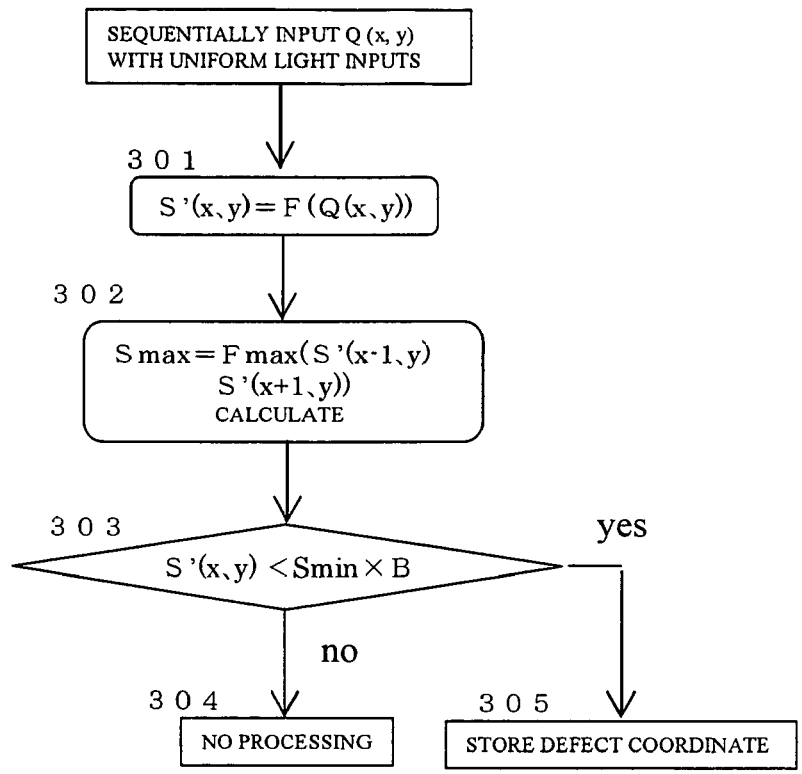
FIG. 10 is a flow chart of signal processing of an image signal according to the third embodiment of the present invention.

In this embodiment, first, as shown in the flow chart in FIG. 10(a), the image inputting device 1 operates in a condition that the image capturing device shown in FIG. 9 receives uniform light signals at all pixels, for recognition of a defective pixel. In this condition, charges Q (x, y) caused by uniform inputting of light at the pixels located at the respective coordinates (x, y) are fed from the image inputting device 1 to the image processing device 2 which executes A/D conversion and converted into the signal intensities S' (x, y) (Step 301), and the respective signal intensities S' (x, y) are fed to the signal processing device 5 through the temporary storage device 4. In this case, the image intensity signal output from a defect-free pixel is supposed to have a value which is calculated by adding a manufacturing-induced variation, a noise level or the like to a certain intensity.

That is, a signal intensity at a normal pixel is sufficiently larger than a small signal intensity attributed to the dirt 21 shown in FIG. 9. Hence, the signal intensity at a pixel which gives rise to a small signal intensity because of the dirt 21 is smaller than the minimum value Smin of the signal intensities at the surrounding pixels, and it is therefore possible to recognize that there is a defect. Noting this, each pixel is compared with a value which is calculated by multiplying the minimum value Smin of the signals at the surrounding pixels by the coefficient B, thereby easily and accurately recognizing a defect. After recognized in this fashion, information indicative of the coordinate of the defective pixel is stored in the defect position information storage device 6. Thus, within the signal processing device 5, with respect to each pixel, the minimum value Smin of the signal intensities at the surrounding pixels is calculated (Step 302), the signal intensity S' (x, y) at this pixel is compared with a value which is calculated by multiplying the minimum value Smin by the coefficient B (Step 303), and when S' (x, y)<Smin×B is satisfied, this pixel is recognized as a defect and coordinate information regarding this pixel is stored in the defect position information storage device 6 (Step 305). The value B is a margin to a noise level, and therefore, B=1 usually. B>1 may however be used when a noise is large. The coordinate information regarding thus recognized defective pixel is stored in the defect position information storage device 6.

Figure 10B:
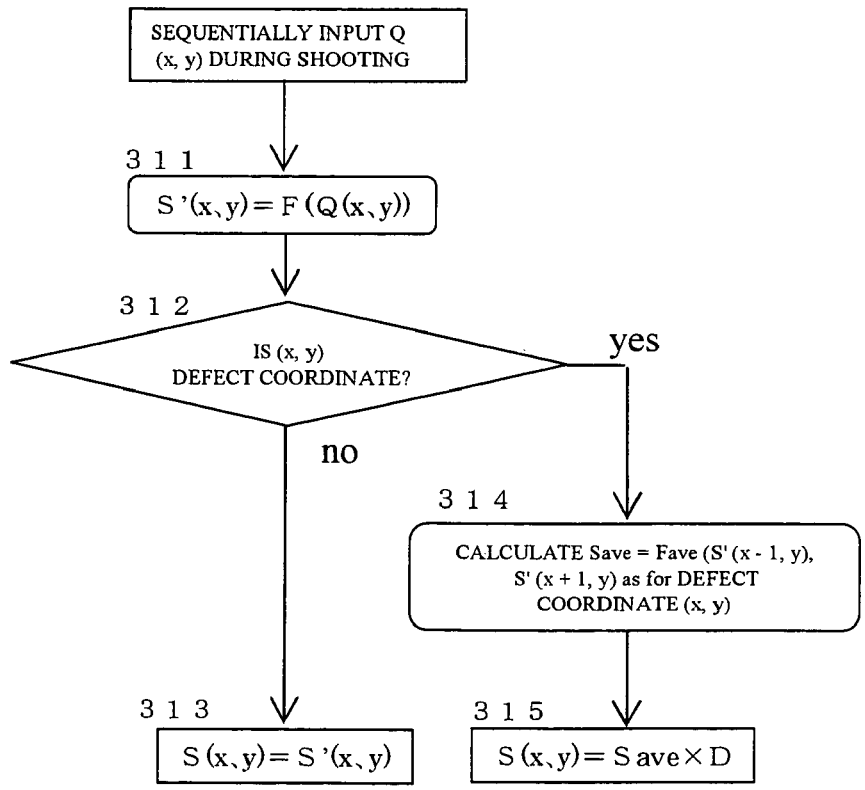

Upon storage of the position of the defective pixel, when the image capturing device is to be actually used for shooting, as shown in the flow chart in FIG. 10(b), charge quantities Q (x, y) at the respective coordinates (x, y) are fed from the image inputting device 1 to the image processing device 2 in a condition that light corresponding to an image is input to the image inputting device 1 and then converted into the signal intensities S' (x, y) (Step 311), and the respective signal intensities S' (x, y) are fed to the signal processing device 5 through the temporary storage device 4. In the signal processing device 5, only as for the pixel which corresponds to the defect coordinate stored in the defect position information storage device 6, the average value Save of signals from the surrounding pixels is calculated and the pixel corresponding to the defect coordinate is replaced with a value which is calculated by multiplying the average value Save by the coefficient D (Step 312, Step 314, Step 315), those which are not defect coordinates are determined as the signal intensities S (x, y)=S' (x, y) (Step 312, Step 313), and these are fed to the image display device or the storage device 3. Defects in the image are compensated and eliminated in this manner.

Since an ordinary signal representing the nature usually will not find only one pixel exceptionally larger or smaller than pixels around this pixel as shown in FIG. 7, when an average signal representing the surrounding positions is used for the position of a defect which is stored, the continuity with the surrounding positions is maintained. This defect therefore will not show as a defect in an image.

Hence, it is possible to compensate defects created after manufacturing as well which are for example defects caused by dirt or the like adhering after the image inputting device 1 is built in equipment, not to mention defects created within the image inputting device 1 during manufacturing.

Clearly, the number n of surrounding pixels for calculation of the average value Save may be n=1, that is, use of adjacent pixels alone, or alternatively n=a plural number, which is use of signals from many pixels.

Fourth Embodiment

Figure 11A:
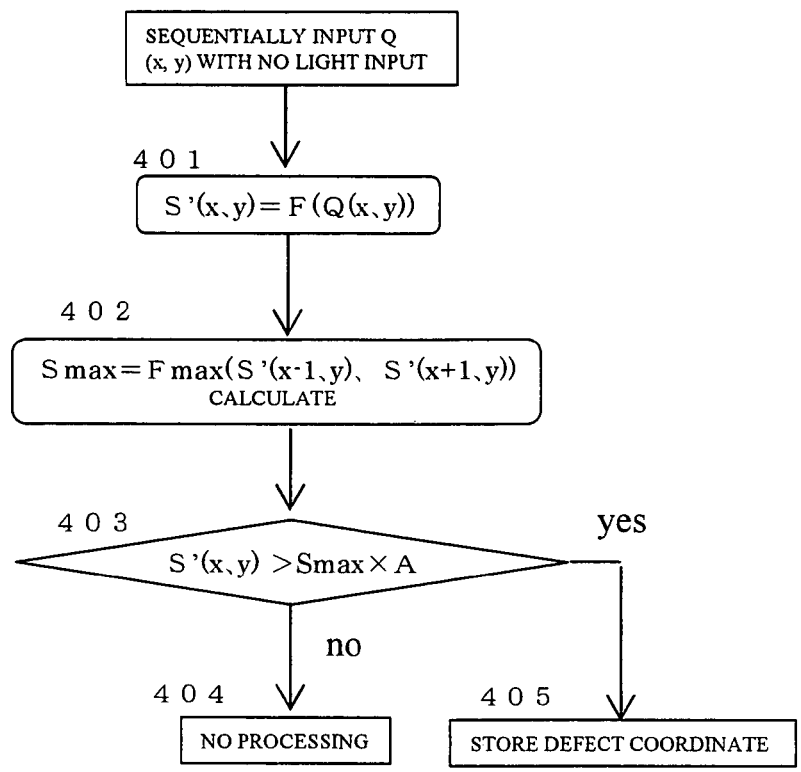
FIG. 11 is a flow chart of signal processing of an image signal according to the fourth embodiment of the present invention.
Figure 11B:
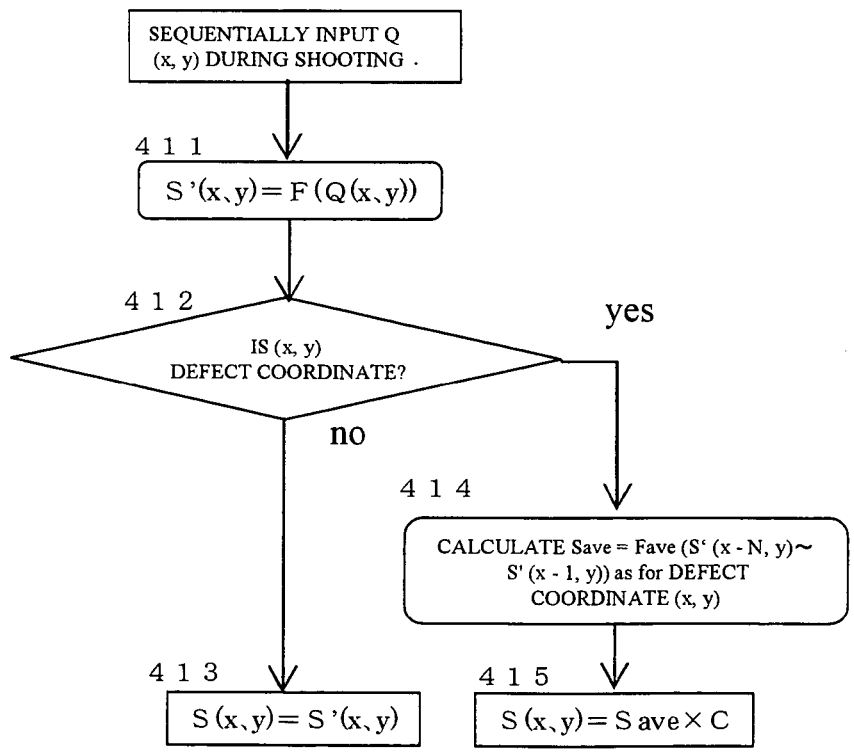

FIG. 11 shows the flow of processing an image signal from an image capturing device according to the fourth embodiment of the present invention. The structure of the image capturing device is the same as that shown in FIG. 9. Coefficients A and C used in the fourth embodiment are similar to the coefficients A and C which are used in the first embodiment.

In this embodiment, first, as shown in the flow chart in FIG. 11(a), the image inputting device 1 operates in a condition that the image capturing device shown in FIG. 9 receives no light signal, and defective pixel recognition is executed. In this condition, charge quantities Q (x, y) as they are without any light input from the pixels at the respective coordinates (x, y) are fed one after another from the image inputting device 1 to the image processing device 2 which executes A/D conversion and converted into the signal intensities S' (x, y) (Step 401), and the respective signal intensities S' (x, y) are fed to the signal processing device 5 one after another. In this case, an image intensity signal output from any defect-free pixel is supposed to be equal to or smaller than a manufacturing-induced variation, a noise level, etc.

That is, a signal intensity at a normal pixel is sufficiently smaller than a large signal intensity attributed to the crystal defect 22 shown in FIG. 9. Hence, the signal intensity at a pixel which gives rise to a large signal intensity because of the crystal defect 22 is larger than the maximum value Smax of the signal intensities at the pixels which are input before the defective pixel, and it is therefore possible to easily and accurately recognize that there is a defect. Noting this, in the signal processing device 5, with respect to each pixel, the maximum value Smax of the signal intensities at N pixels which are input before this pixel (N is a natural number) (Step 402), the signal intensity S' (x, y) at this pixel is compared with a value which is calculated by multiplying the maximum value Smax by the coefficient A (Step 403), and when S' (x, y)>Smax×A is satisfied, this pixel is recognized as a defect and coordinate information regarding this pixel is stored in the defect position information storage device 6 (Step 405).

Upon storage of the position of the defective pixel, when the image capturing device is to be actually used for shooting, as the flow chart in FIG. 11(*b*) shows, charge quantities Q (x, y) at the respective coordinates (x, y) are fed one after another from the image inputting device 1 to the image processing device 2 in a condition that light corresponding to an image is input to the image inputting device 1 and then converted into the signal intensities S' (x, y) (Step 411), and the respective signal intensities S' (x, y) are fed to the signal processing device 5 one after another. In the signal processing device 5, only as for the pixel which corresponds to the defect coordinate stored in the defect position information storage device 6, the average value Save of signals from N pixels which are input before this pixel (N is a natural number) is calculated and the pixel corresponding to the defect coordinate is replaced with a value which is calculated by multiplying the average value Save by the coefficient C (Step 412, Step 414, Step 415), those which are not defect coordinates are determined as the signal intensities S (x, y)=S' (x, y) (Step 412, Step 413), and these are fed to the image display device or the storage device 3. Defects in the image are compensated and eliminated in this manner.

Since an ordinary signal representing the nature usually will not find only one pixel exceptionally larger or smaller than pixels around this pixel as shown in FIG. 7, when an average signal representing the surrounding positions is used for the position of a defect which is stored, the continuity with the surrounding positions is maintained. This defect therefore will not show as a defect in an image. During ordinary image processing, C=1 is appropriate to maintain the continuity of signals. However, C>1 may be used when the contrast of an image is regarded important, to thereby enhance the edge of the image.

Hence, by means of a simple structure, it is possible to compensate defects created after manufacturing as well which are for example defects caused by dirt or the like adhering after the image inputting device 1 is built in equipment, not to mention defects created within the image inputting device 1 during manufacturing.

It is clear that the number N of surrounding pixels for calculation of the average value Save may be N=1, that is, use of next pixels (pixels which are input immediately precedent) alone, or alternatively N=a plural number, which is use of signals from many pixels. When N=a plural number, it is not possible to calculate ten pixel signals as for n<10 pixels. On such an occasion, an immediately precedent pixel may be used, or an average of all precedent pixels may be calculated, or other method may be used for calculation.

Fifth Embodiment

Figure 12A:
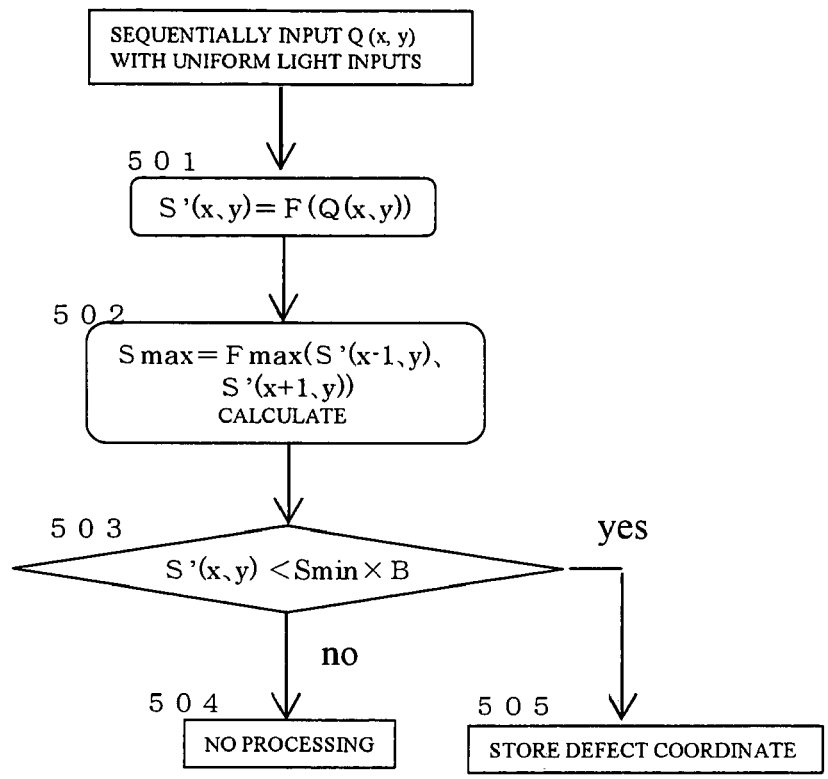
FIG. 12 is a flow chart of signal processing of an image signal according to the fifth embodiment of the present invention.
Figure 12B:
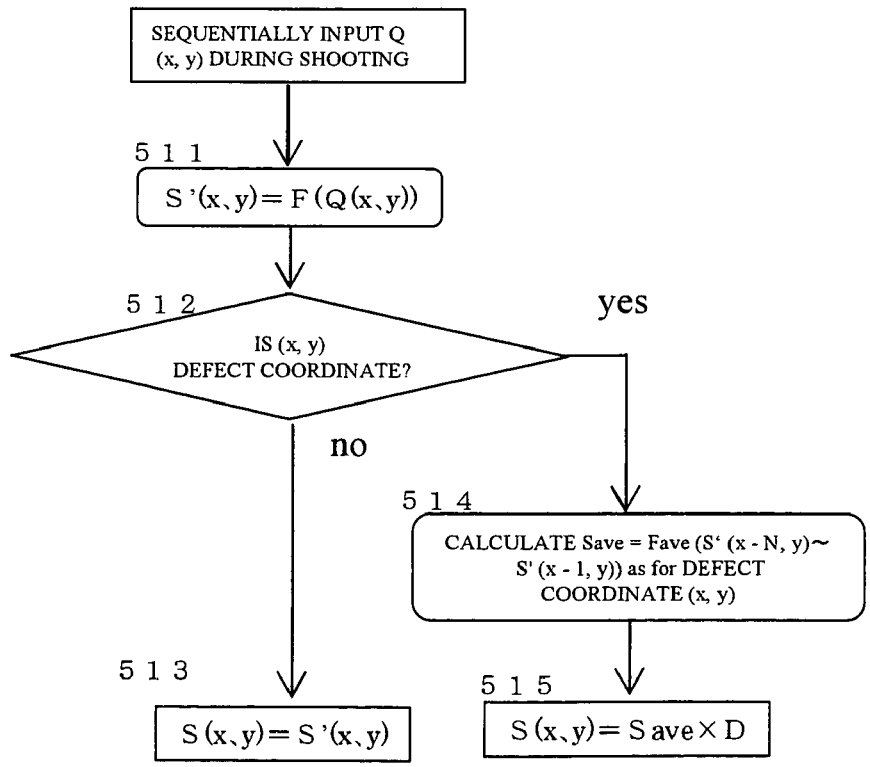
Figure 13:
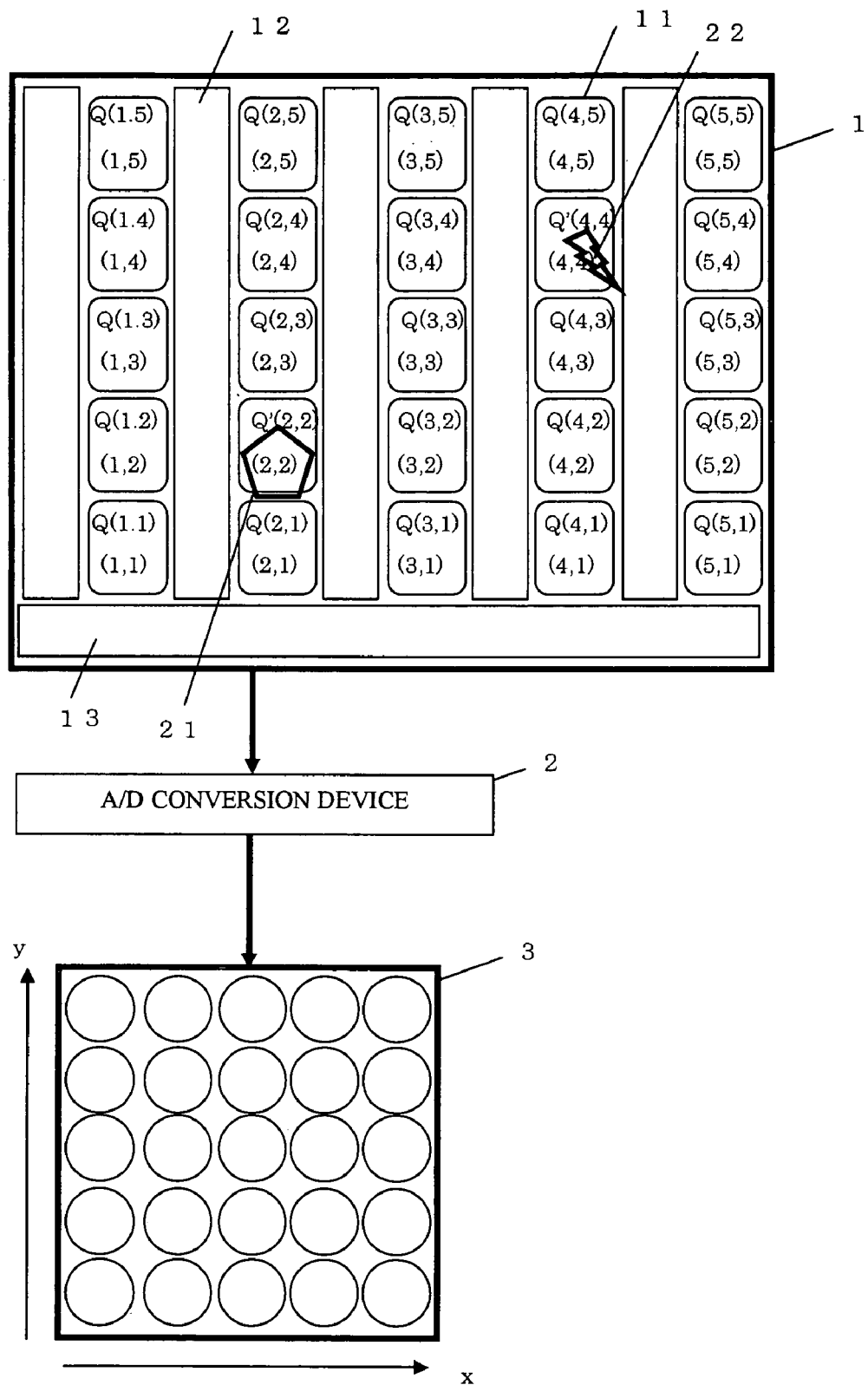
FIG. 13 is a drawing which shows the internal structure of and a flow of an image signal charge in a conventional image capturing device.
Figure 14:
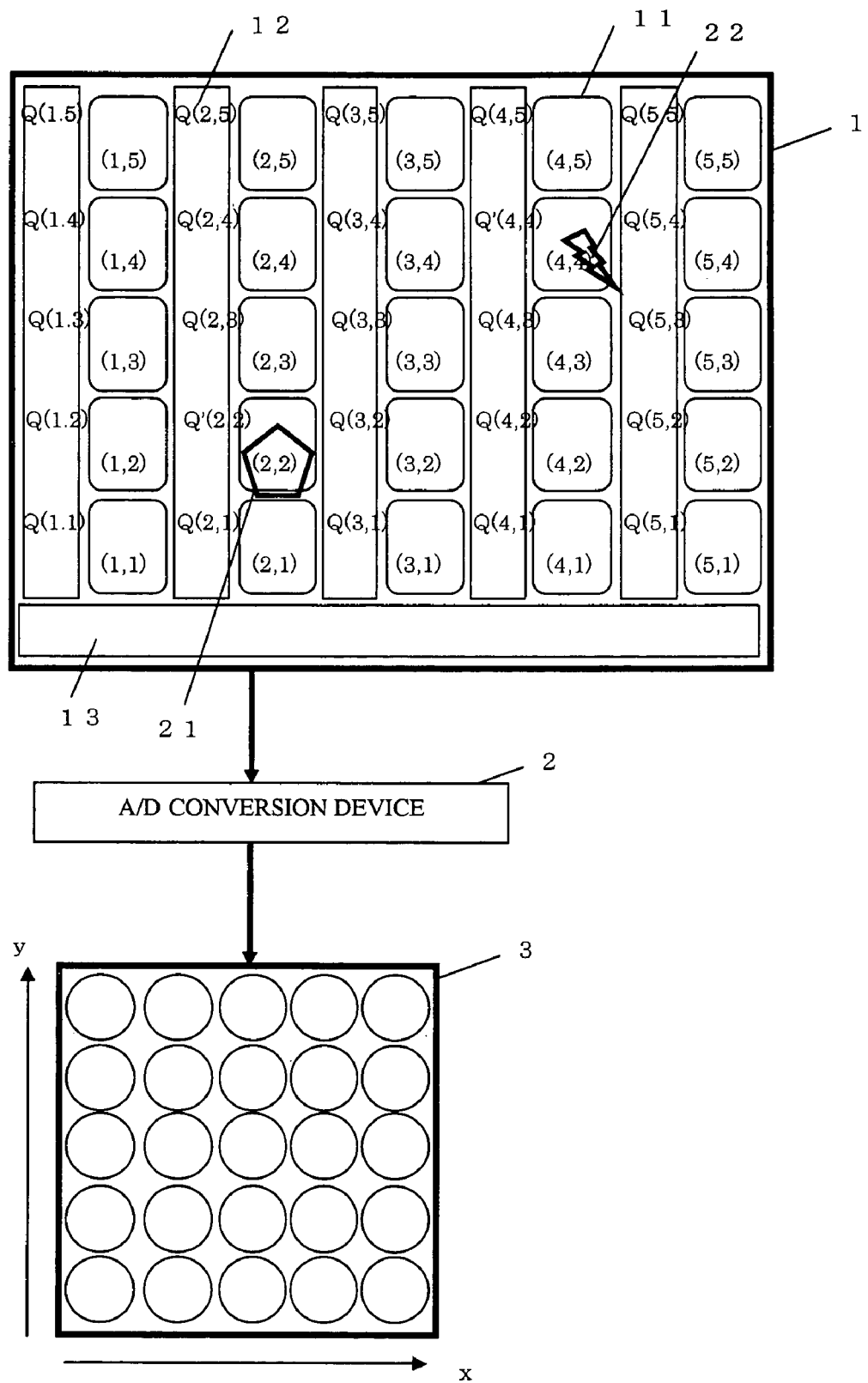
FIG. 14 is a drawing which shows the internal structure of and the flow of an image signal charge in the conventional image capturing device.
Figure 15:
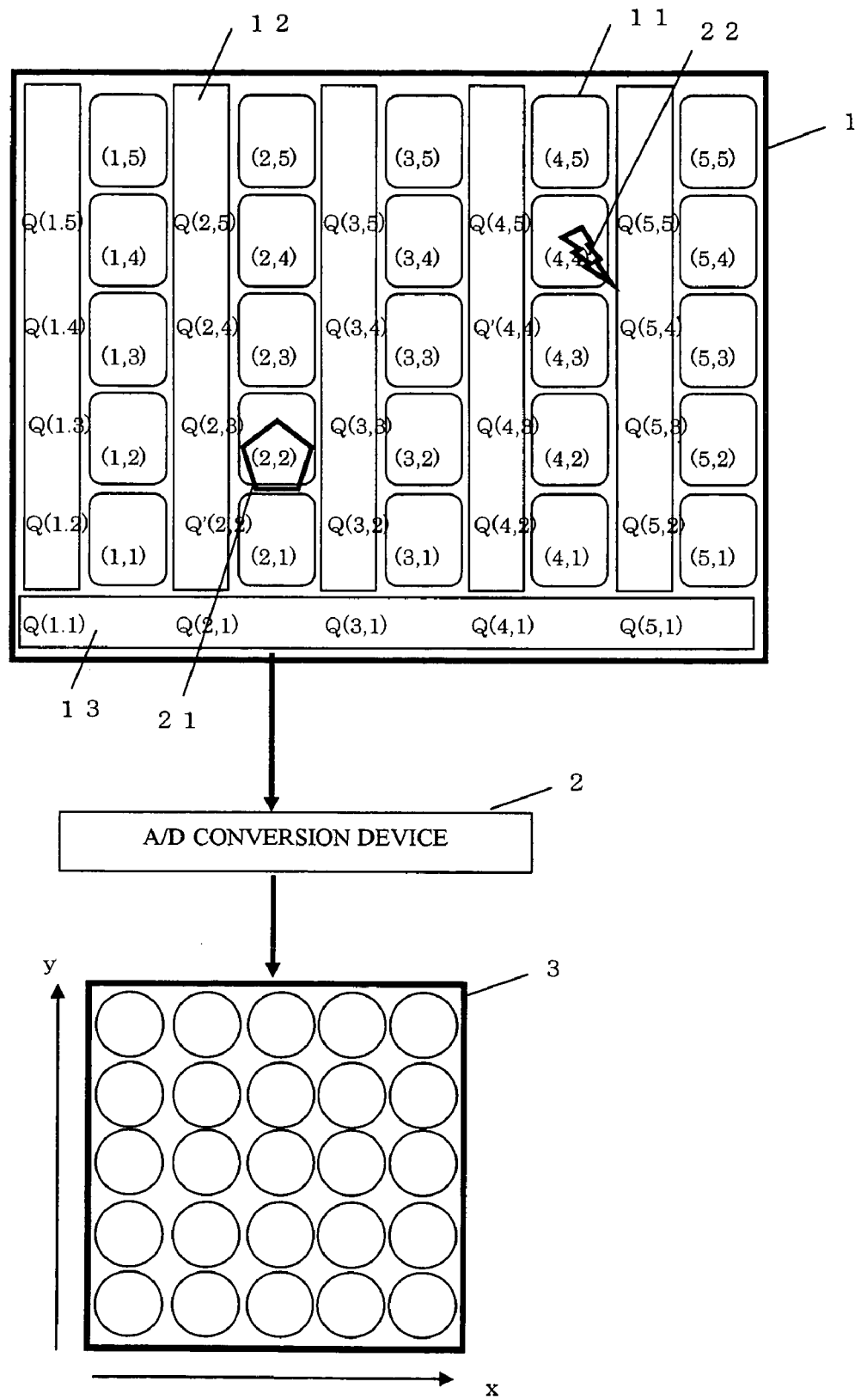
FIG. 15 is a drawing which shows the internal structure of and the flow of an image signal charge in the conventional image capturing device.
Figure 16:
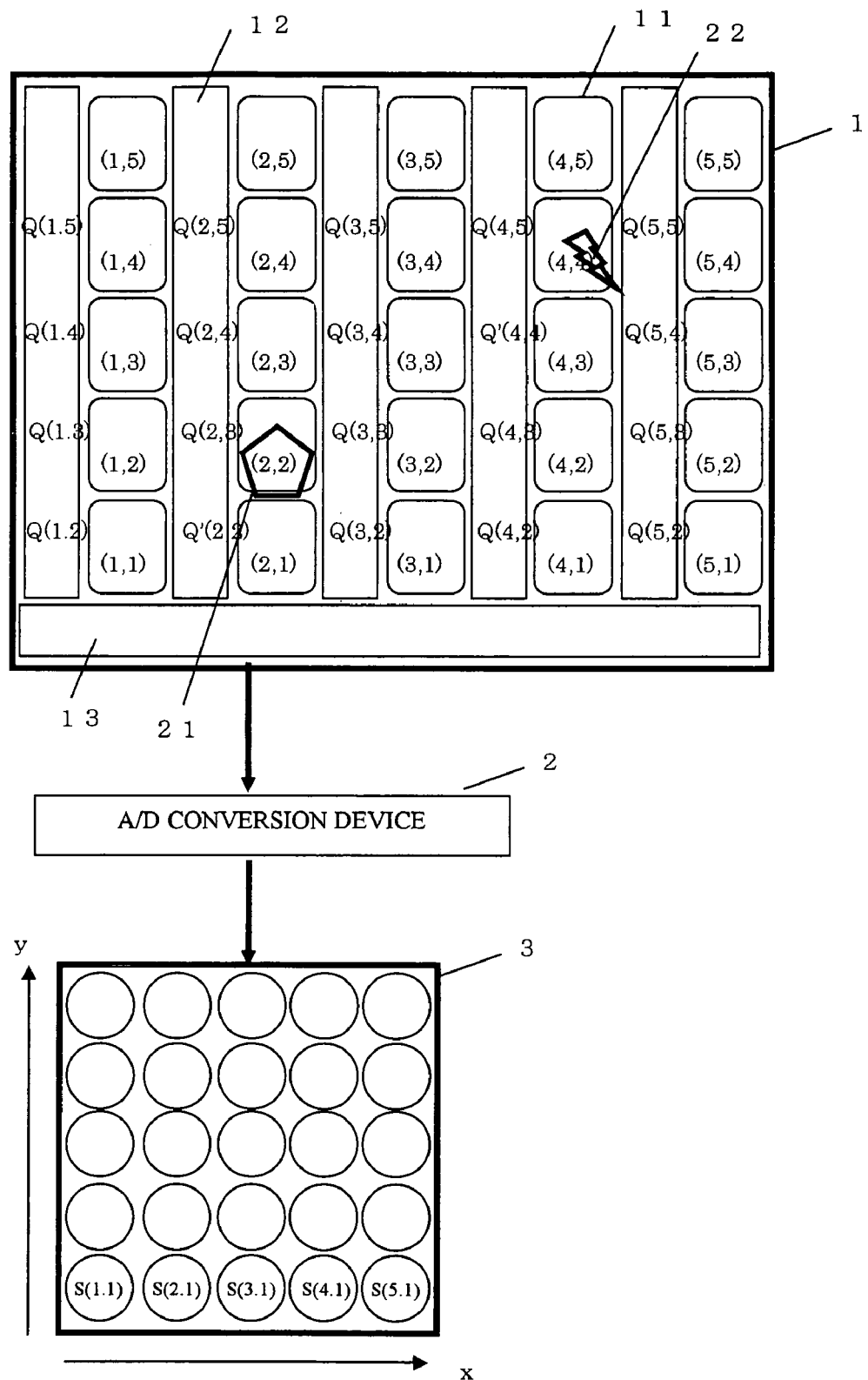
FIG. 16 is a drawing which shows the internal structure of and the flow of an image signal charge in the conventional image capturing device.
Figure 17:
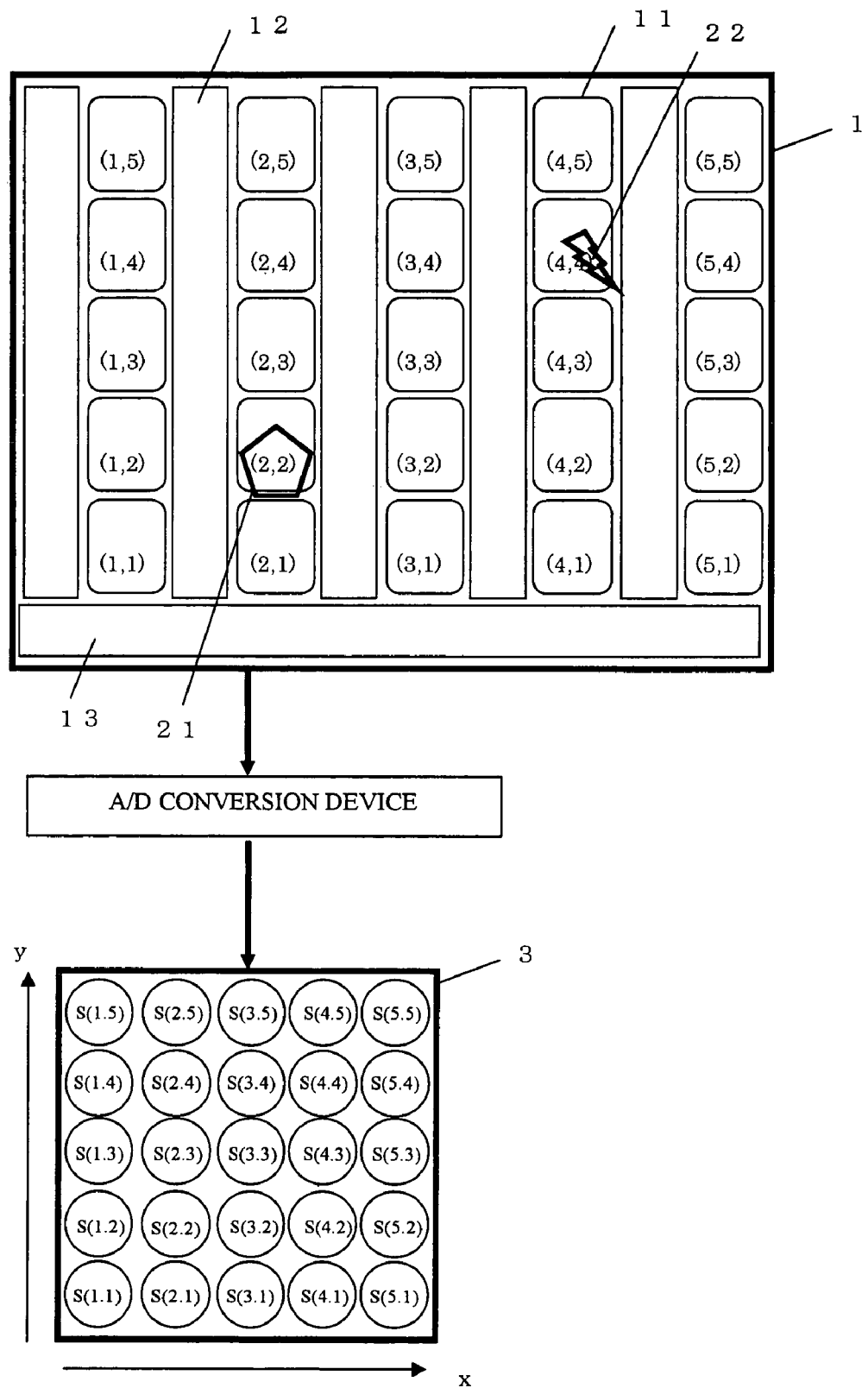
FIG. 17 is a drawing which shows the internal structure of and the flow of an image signal charge in the conventional image capturing device.
Figure 18A:
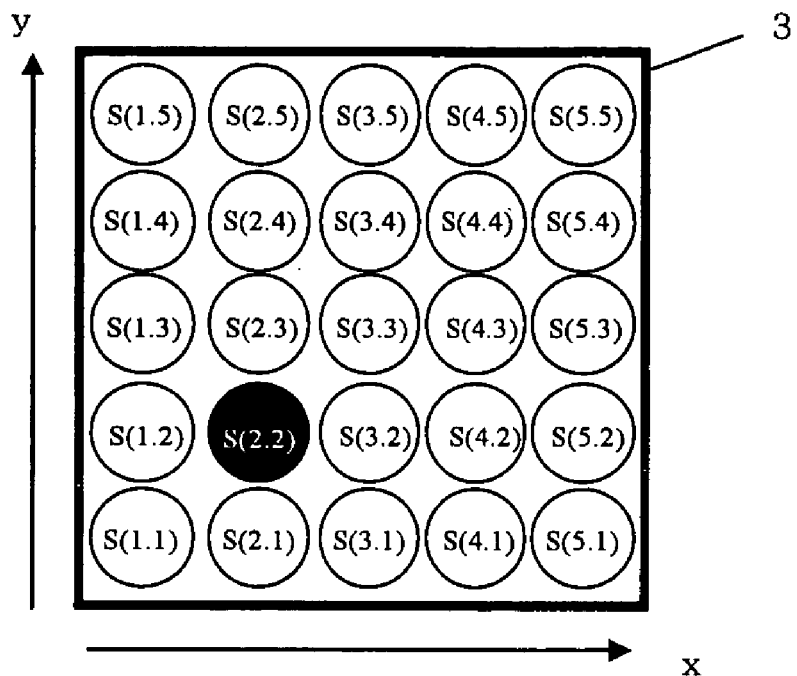
FIG. 18 is a drawing of a displayed image in the event that there is a defective pixel.
Figure 18B:
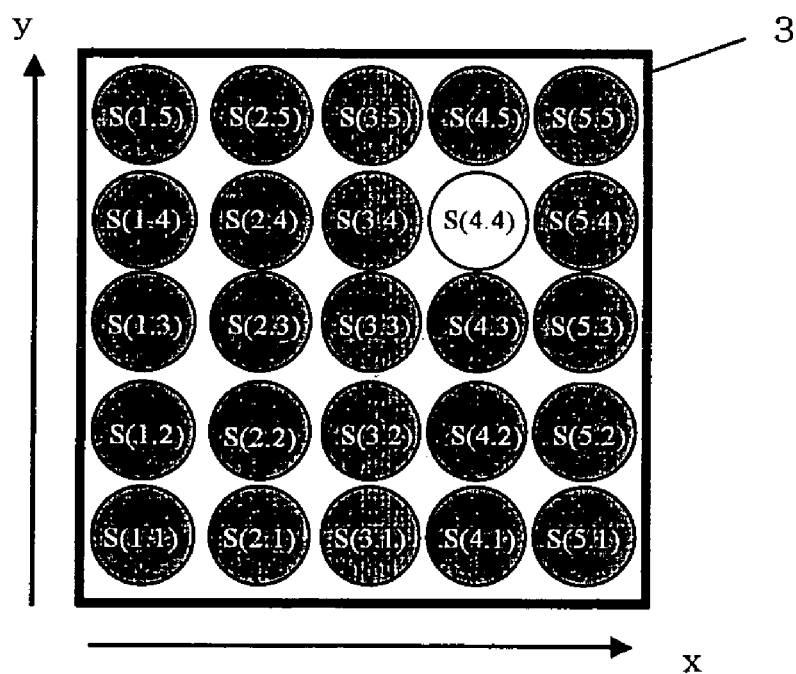

FIG. 12 shows the flow of processing an image signal from an image capturing device according to the fifth embodiment of the present invention. The structure of the image capturing device is the same as that shown in FIG. 9. Coefficients B and D used in the fifth embodiment are similar to the coefficients B and D which are used in the first embodiment.

In this embodiment, first, as shown in the flow chart in FIG. 12(*a*), the image inputting device 1 operates in a condition that uniform light is input to the image capturing device shown in FIG. 9, for recognition of a defective pixel. In this condition, charges Q (x, y) caused by uniform inputting of light at the pixels located at the respective coordinates (x, y) are fed one after another from the image inputting device 1 to the image processing device 2 which executes A/D conversion and converted into the signal intensities S' (x, y) (Step 501), and the respective signal intensities S' (x, y) are fed to the signal processing device 5 one after another. In this case, an image intensity signal is supposed to have a value which is calculated by adding a manufacturing-induced variation, a noise level or the like to a certain intensity.

That is, a signal intensity at a normal pixel is sufficiently larger than a small signal intensity attributed to the dirt 21 shown in FIG. 9. Hence, the signal intensity at a pixel which gives rise to a small signal intensity because of the dirt 21 is smaller than the minimum value Smin of the signal intensities at the pixels which are input before the defective pixel, and this pixel is recognized as a defective pixel. Noting this, each pixel is compared with a value which is calculated by multiplying the minimum value Smin of the signal intensities at N pixels which are input before this pixel (N is a natural number) by the coefficient B thereby easily and accurately recognizing a defect. After recognized in this fashion, information indicative of the coordinate of the defective pixel is stored in the defect position information storage device 6. Thus, within the signal processing device 5, with respect to each pixel, the minimum value Smin of the signal intensities at N pixels which are input before this pixel (N is a natural number) is calculated (Step 502), the signal intensity S' (x, y) at this pixel is compared with a value which is calculated by multiplying the minimum value Smin by the coefficient B (Step 503), and when S' (x, y)<Smin×B is satisfied, this pixel is recognized as a defect and coordinate information regarding this pixel is stored in the defect position information storage device 6 (Step 505). The value B is a margin to a noise level, and therefore, it is usually decided that B=1. B>1 may however be used when a noise is large. The coordinate information regarding thus recognized defective pixel is stored in the defect position information storage device 6.

Upon storage of the position of the defective pixel, when the image capturing device is to be actually used for shooting, as shown in the flow chart in FIG. 12(*b*), charge quantities Q (x, y) at the respective coordinates (x, y) are fed one after another from the image inputting device 1 to the image processing device 2 in a condition that light corresponding to an image is input to the image inputting device 1 and then converted into the signal intensities S' (x, y) (Step 511), and the respective signal intensities S' (x, y) are fed to the signal processing device 5 one after another. In the signal processing device 5, only as for the pixel which corresponds to the defect coordinate stored in the defect position information storage device 6, the average value Save of signals from N pixels which are input before this pixel (N is a natural number) is calculated and the pixel corresponding to the defect coordinate is replaced with a value which is calculated by multiplying the average value Save by the coefficient D (Step 512, Step 514, Step 515), those which are not defect coordinates are determined as the signal intensities S (x, y)=S' (x, y) (Step 512, Step 513), and these are fed to the image display device or the storage device 3. Defects in the image are compensated and eliminated in this manner.

Since an ordinary signal representing the nature usually will not find only one pixel exceptionally larger or smaller than pixels around this pixel as shown in FIG. 7, when an average signal representing the surrounding positions is used for the position of a defect which is stored, the continuity with the surrounding positions is maintained. This defect therefore will not show as a defect in an image. During ordinary image processing, D=1 is appropriate to maintain the continuity of signals with adjacent pixels. However, D>1 may be used when the contrast of an image is regarded important, to thereby enhance the edge of the image.

Hence, by means of a simple structure, it is possible to compensate defects created after manufacturing as well which are for example defects caused by dirt or the like adhering after the image inputting device 1 is built in equipment, not to mention defects created within the image inputting device 1 during manufacturing.

It is clear that the number N of surrounding pixels for calculation of the average value Save may be N=1, that is, use of next pixels (pixels which are input immediately precedent) alone, or alternatively N=a plural number, which is use of signals from many pixels.

Although the foregoing has described the defective pixel recognizing method for where no light signal is available in relation to the second and the fourth embodiment and the defective pixel recognizing method for where uniform light signals are input in relation to the third and the fifth embodiments, it is needless to mention that a combination of these two defective pixel recognizing methods makes both black defects and white defects stored in the defect position information storage device 6 and therefore attains compensation of the both defects.

Further, the defective pixel recognizing methods according to the second through the fifth embodiments and their combinations, when implemented at any desired timing, e.g., at the time that the image capturing device is turned on, in operation or in suspension, achieve compensation of defects which are created while the image inputting device is used or stored. In this case, with a function of defective pixel recognition added automatically at the time of turning on of the power source, defects can be repaired without a user of the equipment noticing the defects, which is needless to mention.

While the first through the fifth embodiments are directed to the compensation method which utilizes pixel signal comparison and which handles a pixel signal regarding the position of a physically defective pixel, in the case of color information, a defective pixel signal may be compared with surrounding pixel signals as for the same chrominance signal among chrominance signals in red, green and blue for instance, which will realize more accurate compensation of a defect.

For expression of the nature, image information handles a combination of chrominance signals in red, green and blue for instance as one pixel. Owing to this, defect repairing only in each one of chrominance signals could in some cases change the balance of color information which is realized by a combination of chrominance signals in red, green and blue for instance, and could result in an unnatural tone. Noting this, a combination of chrominance signals in red, green and blue for instance is treated as one pixel signal which is compared in terms of image signal intensity, to thereby perform more natural defect compensation than where chrominance signals in the same color are compared. This is achieved as the signal processing described above is executed for each one of chrominance signals, and with respect to a pixel to be defect-compensated, the same signal processing is executed for pixels having different chrominance signals handled as one color information.

Although the foregoing has described the first through the fifth embodiments in relation to a structure that the signal processing system is digital, this is not limiting and the first through the fifth embodiments may be similarly applicable to a structure that the signal processing system is analog. The present invention is not limited to the embodiments described above but may of course be modified in various manners without deviating from the gist of the invention.

The present invention attains compensation of a pixel signal as for a physically defective pixel, and as such, is useful when applied to a CCD, a camera, etc.

The invention claimed is:

1. A signal processing method which is executed by a signal processing device for calculation of an image signal intensity by processing image signals from pixels sequentially output from an image inputting device in which plural pixels for photoelectric conversion of incident light are arranged in the horizontal direction and the vertical direction, said signal processing device executing:
   a first step of calculating a maximum value, a minimum value and an average value of image signal intensities of plural pixels which are arranged around a certain pixel; and
   a second step of executing correction of said image signal intensity of said certain pixel by replacing said image signal intensity with a value calculated by multiplying said average value by a coefficient in a range of 1 to 0.8 when said image signal intensity of said certain pixel is larger than a value which is calculated by multiplying said maximum value by a first coefficient, and executing correction of said image signal intensity of said certain pixel by replacing said image signal intensity with a value calculated by multiplying said average value by a coefficient in a range of 0.8 to 0.5 when said image signal intensity of said certain pixel is smaller than a value which is calculated by multiplying said minimum value by a second coefficient, for making said correction in a manner that said correction of said image signal intensity of said certain pixel relative to said image signal intensities of said plural pixels arranged around said certain pixel cannot be recognized effectively.

2. The signal processing method of claim 1, wherein said image signal intensities are the sums of plural chrominance signal intensities.

3. An image capturing device, comprising an image inputting device in which plural pixels for photoelectric conversion of incident light are arranged in the horizontal direction and the vertical direction, a signal processing device which calculates an image signal intensity by processing image signals from pixels sequentially output from said image inputting device, and an image display device or an image storage device which receives said image signal intensity calculated by said signal processing device,
   wherein said signal processing device is equipped with a function of calculating a maximum value, a minimum value and an average value of image signal intensities of plural pixels which are arranged around a certain pixel and correcting said image signal intensity of said certain pixel by replacing said image signal intensity with a value calculated by multiplying said average value by a coefficient in a range of 1 to 0.8 when said image signal intensity of said certain pixel is larger than a value which is calculated by multiplying said maximum value by a first coefficient, and correcting said image signal intensity of said certain pixel by replacing said image signal intensity with a value calculated by multiplying said average value by a coefficient in a range of 0.8 to 0.5 when said image signal intensity of said certain pixel is or smaller than a value which is calculated by multiplying said minimum value by a second coefficient, for making said correction in a manner that said correction of said image signal intensity of said certain pixel relative to said image signal intensities of said plural pixels arranged around said certain pixel cannot be recognized effectively.

* * * * *

UNITED STATES PATENT AND TRADEMARK OFFICE
CERTIFICATE OF CORRECTION

PATENT NO. : 7,636,494 B2 Page 1 of 1
APPLICATION NO. : 11/003735
DATED : December 22, 2009
INVENTOR(S) : Chiaki Kudo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Twenty-first Day of December, 2010

David J. Kappos
*Director of the United States Patent and Trademark Office*